US012206197B2

(12) United States Patent
Johnson et al.

(10) Patent No.: US 12,206,197 B2
(45) Date of Patent: *Jan. 21, 2025

(54) LOCKING CONNECTOR SYSTEM

(71) Applicant: Onanon, Inc., Milpitas, CA (US)

(72) Inventors: Dennis J. Johnson, Milpitas, CA (US); Keyon Keshtgar, Milpitas, CA (US)

(73) Assignee: Onanon, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,056

(22) Filed: Jun. 28, 2023

(65) Prior Publication Data

US 2023/0335935 A1 Oct. 19, 2023

Related U.S. Application Data

(63) Continuation of application No. 17/563,753, filed on Dec. 28, 2021, now Pat. No. 11,695,231, which is a continuation of application No. 17/036,157, filed on Sep. 29, 2020, now Pat. No. 11,233,351.

(51) Int. Cl.

*H01R 13/434* (2006.01)
*H01R 13/426* (2006.01)
*H01R 13/436* (2006.01)
*H01R 13/627* (2006.01)

(52) U.S. Cl.

CPC ......... *H01R 13/434* (2013.01); *H01R 13/426* (2013.01); *H01R 13/4364* (2013.01); *H01R 13/6277* (2013.01)

(58) Field of Classification Search

CPC .............. H01R 13/6275; H01R 13/627; H01R 13/629; H01R 13/62905; H01R 13/62911; H01R 13/62916; H01R 13/62922

See application file for complete search history.

(56) References Cited

U.S. PATENT DOCUMENTS

| | | | | |
|---|---|---|---|---|
| 4,166,664 | A * | 9/1979 | Herrmann, Jr. .... | H01R 13/6276 439/258 |
| 5,316,041 | A | 5/1994 | Ramacier, Jr | |
| 6,345,995 | B1 | 2/2002 | Bigotto | |
| 7,238,047 | B2 * | 7/2007 | Saettele ............... | H01R 13/627 439/578 |
| 7,347,704 | B2 | 3/2008 | Tsuji | |
| 10,122,117 | B2 | 11/2018 | Miller | |
| 10,193,280 | B2 | 1/2019 | Sutter | |
| 10,511,123 | B2 * | 12/2019 | Lin .................... | H01R 13/6277 |
| 10,985,500 | B2 | 4/2021 | Grandcoing | |
| 11,695,231 | B2 * | 7/2023 | Johnson ............. | H01R 13/6278 439/745 |

* cited by examiner

*Primary Examiner* — Ross N Gushi
(74) *Attorney, Agent, or Firm* — Neustel Law Offices

(57) ABSTRACT

A locking connector system for releasably locking a first connector in mechanical engagement with a second connector. The locking connector system generally includes a first connector including a female coupler and a second connector including a male coupler, with the first and second connectors being adapted to mechanically connect to each other. The first connector includes an adjustable latch which selectively engages with a catch portion on the male coupler to lock the connectors together. The latch may be pressed downwardly, such as by use of a connected button, to release the latch from the catch portion and disconnect the connectors. The first connector is adapted to provide audible, visual, and tactile feedback to confirm when the latch engages with the catch portion.

18 Claims, 23 Drawing Sheets

LOCKING CONNECTOR SYSTEM

CROSS REFERENCE TO RELATED APPLICATIONS

The present application is a continuation of U.S. application Ser. No. 17/563,753 filed on Dec. 28, 2021 which issues as U.S. Pat. No. 11,695,231 on Jul. 4, 2023, which is a continuation of U.S. application Ser. No. 17/036,157 filed on Sep. 29, 2020 now issued as U.S. Pat. No. 11,233,351. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a locking connector system for releasably locking a first connector in mechanical engagement with a second connector.

Related Art

Any discussion of the related art throughout the specification should in no way be considered as an admission that such related art is widely known or forms part of common general knowledge in the field.

Electrical connectors are commonly used for connecting power, data, and/or other electrical signals between two different components. Such electrical connectors have become ubiquitous with modern life. Common electrical connectors used daily by billions of people include power charging cables for smart phones. Typically, a male coupler which includes male electrical connectors is electrically connected to a female coupler which includes female electrical connectors. When the male electrical connectors are adequately engaged with corresponding female electrical connectors, an electrical connection is made between the first and second connectors.

Typical electrical connectors utilize both a mechanical and electrical connection to engage the connectors together. However, connectors which are only partially mechanically-engaged may not establish an electrical connection since any electrically conductive elements may not be in contact if the mechanical engagement of the two connectors is not completed. Further, typical electrical connectors are easily disconnected when engaged, which can lead to inadvertently disconnecting such connectors without realizing it. Locking the connectors together in a releasable manner may prevent such situations. Finally, typical electrical connectors do not provide any feedback to indicate that the connectors are mechanically engaged with each other.

SUMMARY

An example embodiment is directed to a locking connector system. The locking connector system includes a first connector including a female coupler and a second connector including a male coupler, with the first and second connectors being adapted to mechanically connect to each other. The first connector includes an adjustable latch which selectively engages with a catch portion on the male coupler to lock the connectors together. The latch may be pressed downwardly, such as by use of a connected button, to release the latch from the catch portion and disconnect the connectors. The first connector is adapted to provide audible, visual, and tactile feedback to confirm when the latch engages with the catch portion.

There has thus been outlined, rather broadly, some of the embodiments of the locking connector system in order that the detailed description thereof may be better understood, and in order that the present contribution to the art may be better appreciated. There are additional embodiments of the locking connector system that will be described hereinafter and that will form the subject matter of the claims appended hereto. In this respect, before explaining at least one embodiment of the locking connector system in detail, it is to be understood that the locking connector system is not limited in its application to the details of construction or to the arrangements of the components set forth in the following description or illustrated in the drawings. The locking connector system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
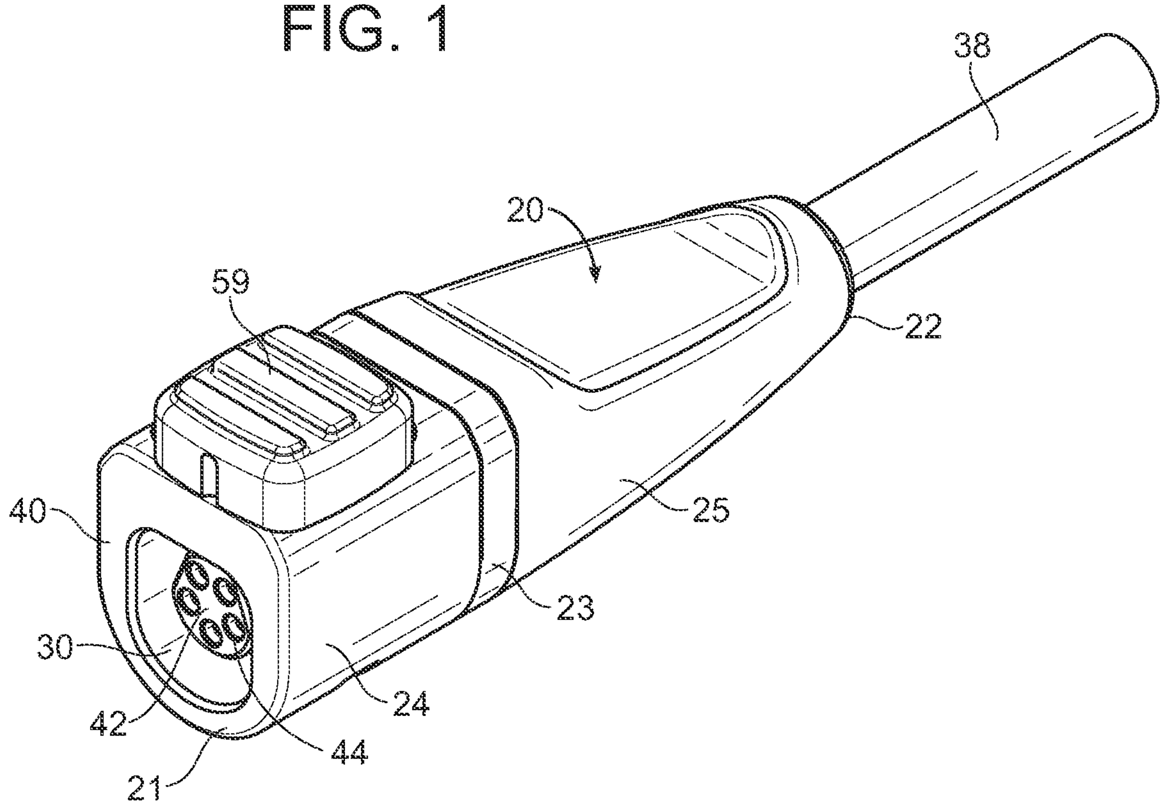
FIG. 1 is a perspective view of a first connector of a locking connector system in accordance with an example embodiment.

An example locking connector system generally comprises a first connector 20 comprising a front end 21, a rear end 22, and a housing 23, wherein the first connector 20 comprises a plurality of first electrically conductive elements 44; a second connector 60 comprising a front end 61 and a rear end 62, the second connector 60 comprising a plurality of second electrically conductive elements 64, wherein the first connector 20 is adapted to be removably connected to the second connector 60, wherein the second connector 60 comprises a flange 75 at or near the front end 61 of the second connector 60, wherein the flange 75 defines a catch portion 74; a latch 50 connected to the first connector 20 such that the latch 50 is movable with respect to the housing 23, wherein the latch 50 is adjustable between a first position and a second position; and a bias member 58 connected to the latch 50, wherein the latch 50 is biased towards the first position by the bias member 58; wherein the latch 50 is adapted to engage with the catch portion 74 when the latch 50 is in the first position so as to lock the first connector 20 in mechanical engagement with the second connector 60, wherein the latch 50 is adapted to disengage from the catch portion 74 when the latch 50 is in the second position so as to release the first connector 20 and the second connector 60.

The first position of the latch 50 may be comprised of a raised position and the second position of the latch 50 may be comprised of a lowered position. The plurality of first electrically conductive elements 44 and the plurality of second electrically conductive elements 64 may be comprised of pins or sockets. The first connector 20 may comprise a female coupler 40 and the second connector 60 may comprise a male coupler 70.

The latch 50 may comprise a central opening 53, wherein the male coupler 70 is adapted to be inserted through the central opening 53 of the latch 50 when the first connector 20 is connected to the second connector 60. The housing 23 of the first connector 20 may comprise a lower opening 36, wherein a lower end 52 of the latch 50 extends into the lower opening 36 of the first connector 20 when the latch 50 is in the second position. The lower opening 36 may comprise a slot on the lower end of the housing 23 of the first connector 20, wherein the lower end of the latch 50 is sized and shaped for extending into the slot when the latch 50 is in the second position. The latch 50 may be adapted to audibly click when the latch 50 engages with the catch portion 74 of the second connector 60. The housing 23 may be adapted to reverberate when the latch 50 engages with the catch portion 74 of the second connector 60.

The flange 75 may comprise an inclined surface such as a ramp 79 inclined upwardly towards the catch portion 74. The latch 50 may comprise a lower end 52 including an inner lower edge 55, wherein the inner lower edge 55 of the latch 50 is adapted to pass over the inclined surface of the flange 75 to engage with the catch portion 74. The catch portion 74 may be comprised of a groove defined by the flange 75.

A button 59 may be connected to an upper end 52 of the latch 50, wherein the button 59 extends at least partially out of an upper end of the housing 23. The bias member 58 may be connected between the upper end 51 of the latch 50 and the button 59. The upper end 51 of the latch 50 may comprise a fastener 47 for connecting the button to the latch, wherein the bias member 58 is positioned around the fastener 47. The button 59 may be adapted to be pressed downwardly to push the latch 50 into the second position. The bias member 58 may be connected between the latch 50 and the button 59 so as to bias the button 59 and the latch 50 towards the first position.

The upper end 51 of the latch 50 may comprise a first flange 56*a*, a second flange 56*b*, and a depressed portion 57 defined between the first flange 56*a* and the second flange 56*b*. The button 59 may be connected between the first flange 56*a* and the second flange 56*b*, with the bias member 58 being positioned within the depressed portion 56 of the latch 50. The bias member 58 may be comprised of a wide range of types of bias members such as springs including but not limited to a coil spring, a beam spring, a wave spring, and a dome spring. The beam spring may comprise a plastic beam spring.

The latch 50 may comprise an upper end 51 and a lower end 52, wherein the upper end 51 of the latch 50 is flat and wherein the lower end 52 of the latch 50 is curved. The lower end 52 of the latch 50 may comprise an inner lower edge 55, wherein the inner lower edge 55 of the latch 50 is adapted to engage within the catch portion 74 of the second connector 60 when the first connector 20 is connected to the second connector 60, wherein the flange 75 of the second connector 60 is adapted to prevent the first connector 20 from being disconnected from the second connector 60 when the inner lower edge 55 of the latch 50 is engaged within the catch portion 74 of the second connector 60.

The housing 23 may comprise a lower opening 36 for providing both a visual and tactile indicator of whether the latch 50 is in the first position or the second position, wherein the latch 50 is visible within the lower opening 36 of the housing 23 when the latch 50 is not in the first position and wherein the latch 50 is not visible within the lower opening 36 of the housing 23 when the latch 50 is in the first position. The latch 50 can be felt within the lower opening 36 of the housing 23 when the latch 50 is not in the first position and the latch cannot be felt within the lower opening 36 of the housing 23 when the latch 50 is in the first position.

Another exemplary embodiment of a locking connector system 10 may comprise 34 a first connector 20 comprising a front end 21, a rear end 22, and a housing 23, wherein the first connector 20 comprises a plurality of first electrically conductive elements 44, wherein the housing 23 comprises an upper side opening 85*a* and a lower side opening 86*a*; a second connector 60 comprising a front end 61 and a rear end 62, the second connector 60 comprising a plurality of second electrically conductive elements 64, wherein the first connector 20 is adapted to be removably connected to the second connector 60, wherein the second connector 60 comprises a catch portion 74; a latch 50 connected to the first connector 20 such that the latch 50 is movable with respect to the housing 23, wherein the latch 50 is adjustable between a first position and a second position, wherein the latch 50 comprises a projection 80*a*, wherein the projection 80*a* is adapted to engage with the upper side opening 85*a* of the first connector 20 when the latch 50 is in the first position, wherein the projection 80*a* is adapted to engage with the lower side opening 86*a* of the first connector 20 when the latch is in the second position; wherein the latch 50 is adapted to engage with the catch portion 74 when the latch 50 is in the second position so as to lock the first connector 20 in mechanical engagement with the second connector 60, wherein the latch 50 is adapted to disengage from the catch portion 74 when the latch 50 is in the first position so as to release the first connector 20 and the second connector 60. The first position may be comprised of a raised position and the second position may be comprised of a lowered position.

B. First Connector

FIG. 1 illustrates an exemplary first connector 20 comprising a female coupler 40. The first connector 20 comprises a housing 23 having a front portion 24 and a rear portion 25. A cable 38 enclosing a plurality of wires 39 is connected to or enters the rear portion 25 of the first connector 20 via a rear opening 32. A front opening 30 is shown providing access to a plurality of first electrically conductive elements 44 comprising sockets for receiving pins. The first electrically conductive elements 44 are illustrated as being recessed within the housing 23, though in some embodiments the first electrically conductive elements 44 may be flush with the front end 21 of the first connector 20 rather than being recessed.

Figure 2:
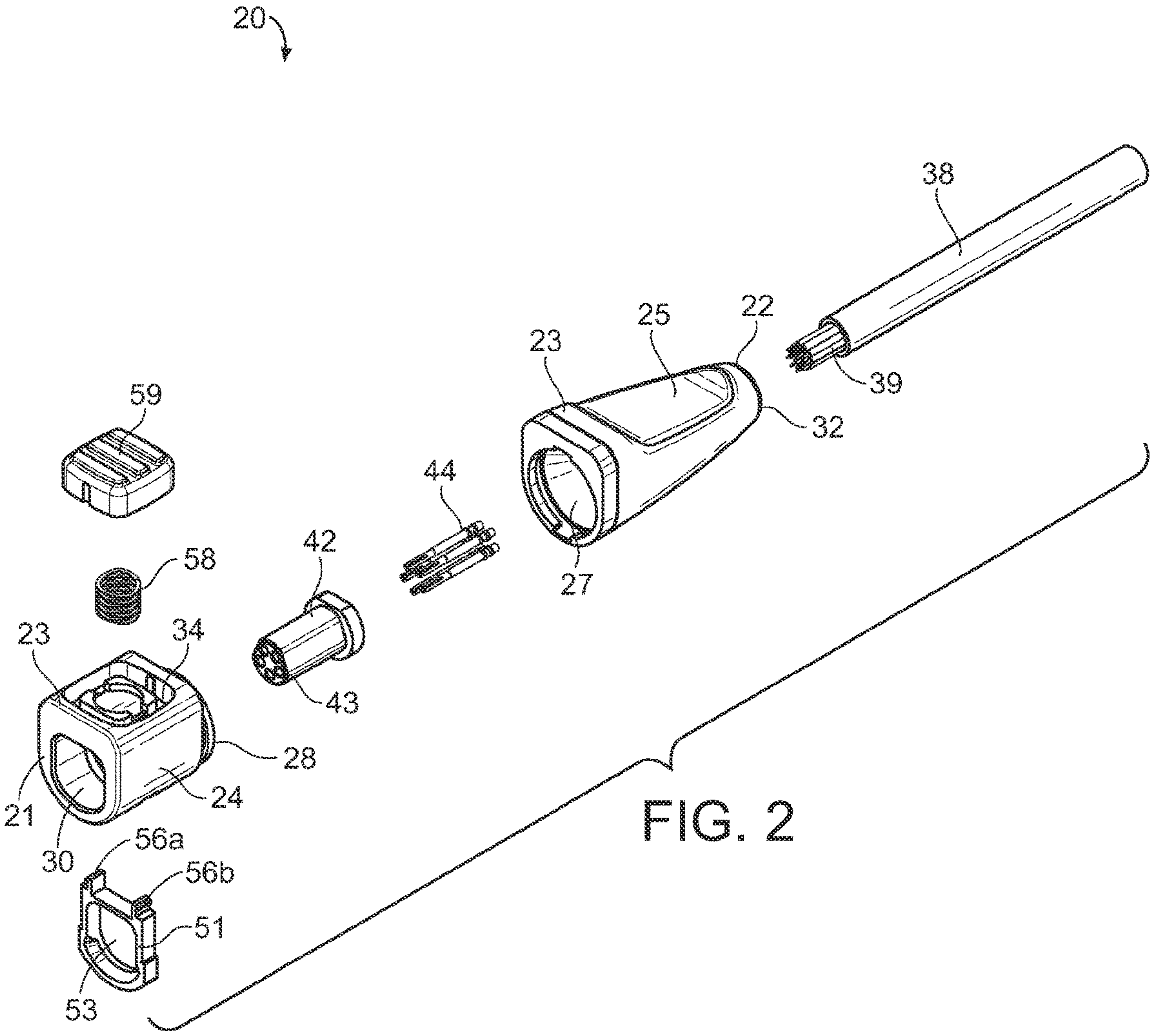
FIG. 2 is an exploded view of a first connector of a locking connector system in accordance with an example embodiment.
Figure 3:
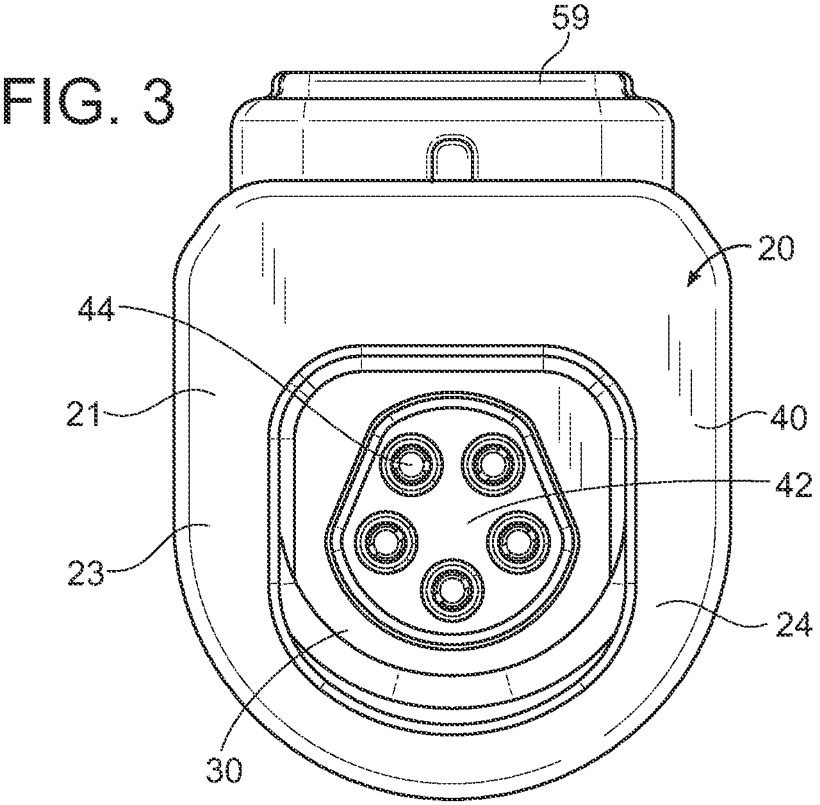
FIG. 3 is a front view of a first connector of a locking connector system in accordance with an example embodiment.

FIG. 2 illustrates an exploded view of an exemplary embodiment of a first connector 20 with the housing 23 being split between its front portion 24 and its rear portion 25. The cable 38 is shown with a plurality of wires 39 which enter the rear portion 25 of the housing 23 via the rear opening 32. A pin insert 42 comprising a plurality of openings 43 is positioned to straddle both the front and rear portions 24, 25 of the housing 23. In some embodiments, the pin insert 42 may be positioned entirely in the front portion 24 or the rear portion 25 of the housing 23.

Continuing to reference FIG. 2, the front portion 24 of the housing 23 comprises a female coupler 44 adapted to receive a corresponding male coupler 70 of a second connector 60. The female coupler 44 is illustrated as comprising a substantially cylindrical member having a flattened upper end which may be matingly engaged with the rear portion 25 of the housing 23. The female coupler 44 comprises a front opening 30 adapted to matingly receive the male coupler 70 of the second connector 60.

A latch 50 is shown in FIG. 2 which, when the locking connector system 10 is assembled, is movably positioned within the female coupler 40. The latch 50 includes a pair of flanges 56*a*, 56*b* which are adapted to connect to a button 59, with a bias member 58 being connected to the latch 50 to bias the latch 50 upwardly.

FIGS. 1-8 illustrate an exemplary first connector 20 adapted for use with the locking connector system 10. As shown in FIG. 1, the first connector 20 may comprise a front end 21, a rear end 22, and a housing 23. The housing 23 includes a front portion 24 which includes the front end 21 and a rear portion 25 which includes the rear end 22. The housing 23 may comprise a single, unitary structure such as molded plastic or may comprise interconnected portions 24, 25. For example, the front portion 24 may be removably connected to the rear portion 25. In other embodiments, the front and rear portions 24, 25 may be fixedly connected or may be integrally formed. The housing 23 will generally comprise of insulating material such as plastics or the like.

The shape, size, and configuration of the housing 23 will vary in different embodiments to suit different types of connectors 20 and electrically conductive elements 44. In the exemplary embodiment shown in FIGS. 1-5, the housing 23 includes ergonomic features to aid in gripping, such as a depressed portion on the upper end of the rear portion 25 of the housing 23 as shown in FIG. 1. The front portion 24 of the housing 23 may comprise a coupler such as a female coupler 40. The front portion 24 of the housing 23 will generally be shaped so as to engage with an opposing second connector 60.

In the exemplary embodiment shown in FIGS. 1-5, the front portion 24 of the housing 23 comprises a flat upper end and a curved lower end so as to prevent rotation of the connectors 20, 60 when coupled together. Such a configuration will also ensure that the connectors 20, 60 are properly oriented when coupled together.

The first connector 20 as illustrated in FIG. 1 comprises a female coupler 40 having a front opening 30 adapted to receive a corresponding male coupler 70 of a second connector 60. The shape, size, and configuration of the front opening 30 of the first connector 20 may vary in different embodiments to suit different types of opposing second connectors 60. The front opening 30 of the first connector 20 will generally be shaped and sized so as to snugly receive the male coupler 70 of the second connector 60. The front opening 30 of the first connector 20 is shown in FIGS. 1-5 as comprising a flat upper end and a curved lower end to ensure proper orientation and prevent rotation of the connectors 20, 30 when connected together.

As best shown in FIGS. 1 and 2, the rear portion 25 of the first connector 20 may be configured to receive or connect to a cable 38. The cable 38 may include one or more electrical conduits 39 such as electrical wires or the like adapted to transmit electrical power or signals. The one or more electrical conduits 39 are generally electrically connected, either directly or indirectly, to the first electrically conductive elements 44. The housing 23 of the first connector 20 may include a rear opening 32 such as shown in FIG. 2 which is configured to receive the cable 38 and/or electrical conduit(s) 39.

As shown in FIG. 2, the housing 23 of the first connector 20 may comprise an upper opening 34 to accommodate an adjustable latch 50, with the adjustable latch 50 being movable with respect to the housing 23. The upper opening 34 may comprise various shapes and sizes sufficient to allow the latch 50 to be pressed downward by a user, such as by use of a button 59 as discussed below. The upper opening 34 may comprise a depression, slot, cavity, or the like in which the latch 50 may be movable secured.

As shown in FIGS. 1-5, the housing 23 may include a button 59 which is utilized to depress the latch 50. In the exemplary embodiment shown in FIG. 1, the button 59 is positioned within the upper opening 34 of the housing 23. In such an embodiment, the button 59 is sized and shaped so as to snugly fit within the upper opening 34 of the first connector 20.

It should be appreciated, however, that the button 59 may comprise various shapes, sizes, and configuration. For example, the button 59 could be positioned at various other locations on the housing 23, such as on the lower end or either side. Further, the button 59 may fully extend out from the housing 23 or may be partially positioned within the housing 23 when not depressed. Further, the button 59 is illustrated as being pushed down to adjust the latch 50. In other embodiments, the button 59 may comprise a switch or the like which is not depressed vertically but instead adjusted in other manners. The button 59 may include ergonomic or gripping features such as ribs.

Figure 8:
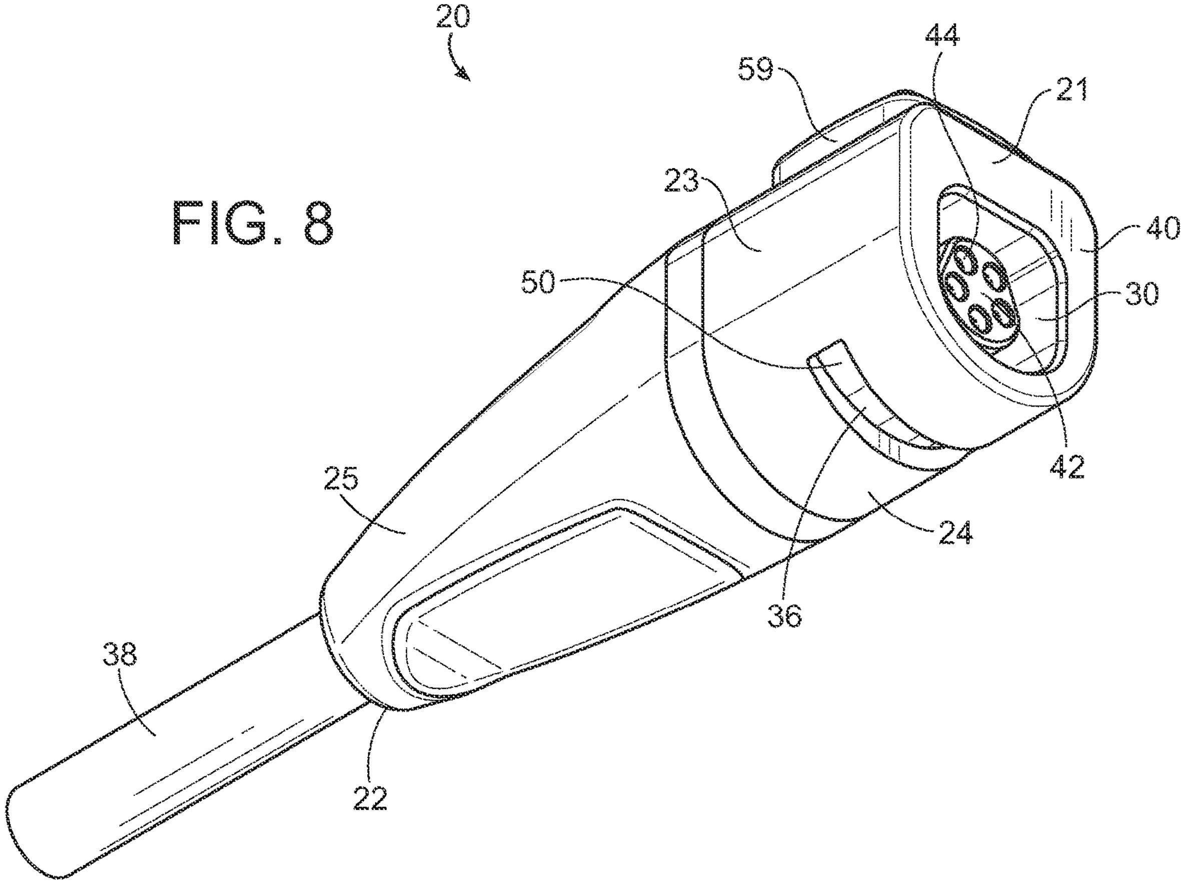
FIG. 8 is a bottom perspective view of a first connector of a locking connector system in accordance with an example embodiment.
Figure 21A:
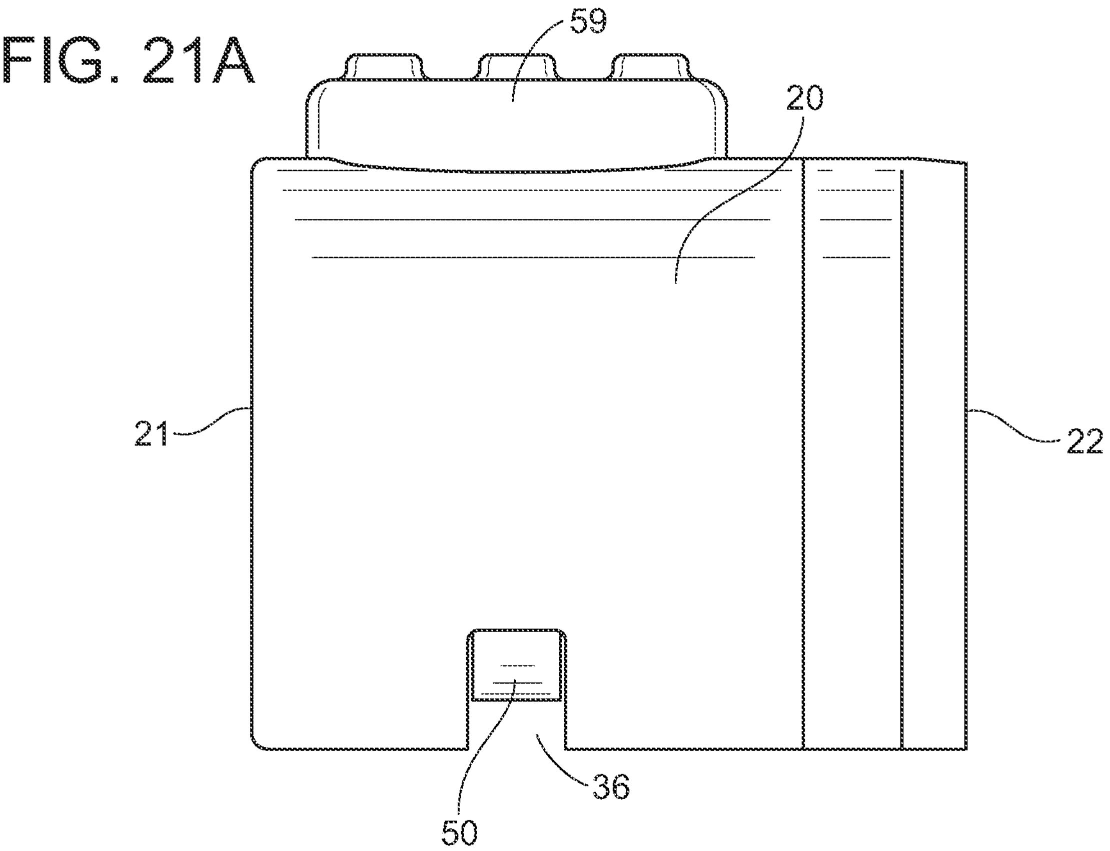
FIG. 21A is a side view illustrating a first connector with the button and latch in a raised position of a locking connector system in accordance with an example embodiment.
Figure 21B:
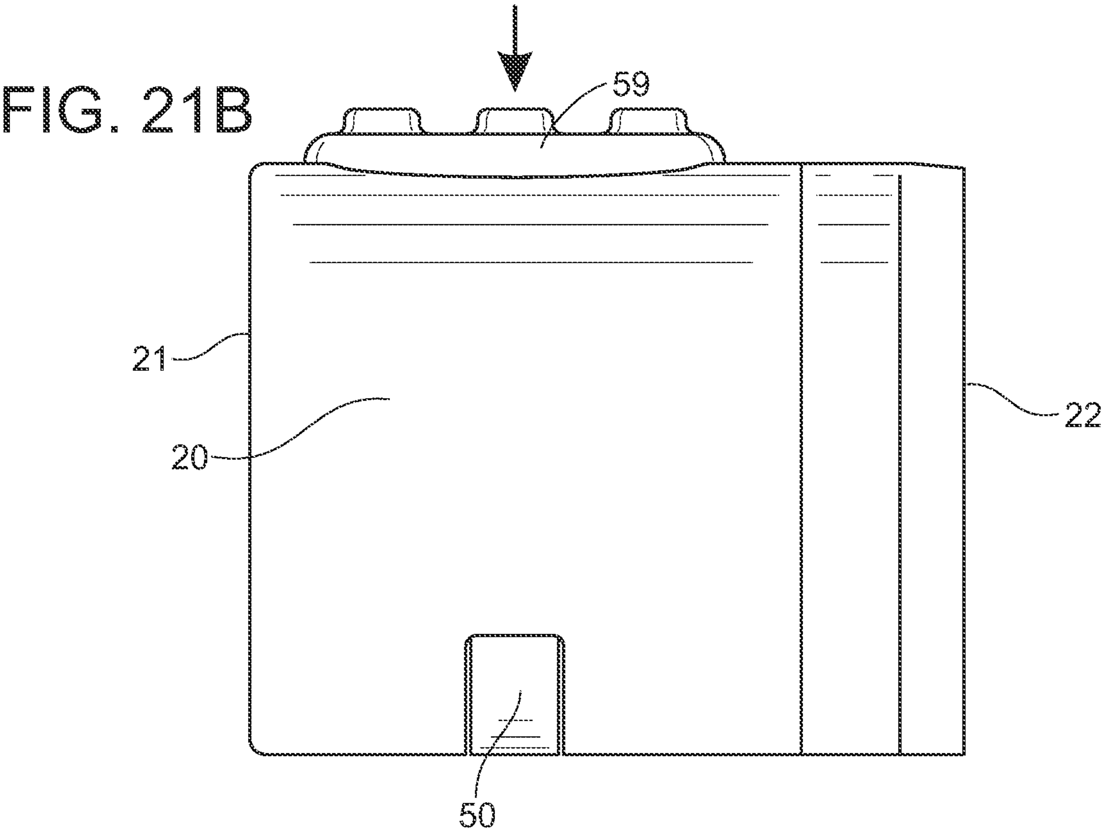
FIG. 21B is a side view illustrating a second connector with the button and latch in a lowered, depressed position of a locking connector system in accordance with an example embodiment.

As shown in FIGS. 8, 21A, and 21B, the housing 23 may include a lower opening 36 at its lower end near the front end 21 of the first connector 20. The lower opening 36 may function as an indicator of whether the latch 50 is in its lowered or raised position. The shape, size, and positioning of the lower opening 36 may vary in different embodiments. While the figures illustrate that the lower opening 36 is comprised of a curved rectangular shape, it should be appreciated that other shapes such as circular, triangular, polygonal, or the like may be utilized.

In the exemplary embodiment shown in the figures, the lower opening 36 comprises a rectangular window into which the lower end 52 of the latch 50 will extend when the latch 50 is in its lowered position. The lower opening 36 may in some embodiments be positioned at other locations on the housing 23. For example, the lower opening 36 could in some embodiments be positioned on a side of the housing 23.

The lower opening 36 primarily functions to provide an easy-to-view indication of whether the latch 50 is in it's lowered (engaged) or raised (disengaged) position. When in the lowered position, the lower end 52 of the latch 50 will at least partially fill the lower opening 36 such as shown in FIG. 21A. When in the raised position, the lower end 52 of the latch 50 will not be positioned in the lower opening 36 such as shown in FIG. 21B. In this manner, an operator may quickly ascertain whether the latch 50 is engaged or not.

Continuing to reference FIGS. 1-8, it can be seen that the first connector 20 in the illustrated exemplary embodiment is shown as comprising a female coupler 40. It should be appreciated, however, that in some embodiments the first connector 20 may comprise a male coupler 70, with the second connector 50 comprising the female coupler 40. In either case, the first and second connectors 20, 50 are adapted to mechanically engage with each other via insertion and retention of a male coupler 70 within a female coupler 40.

Figure 15:
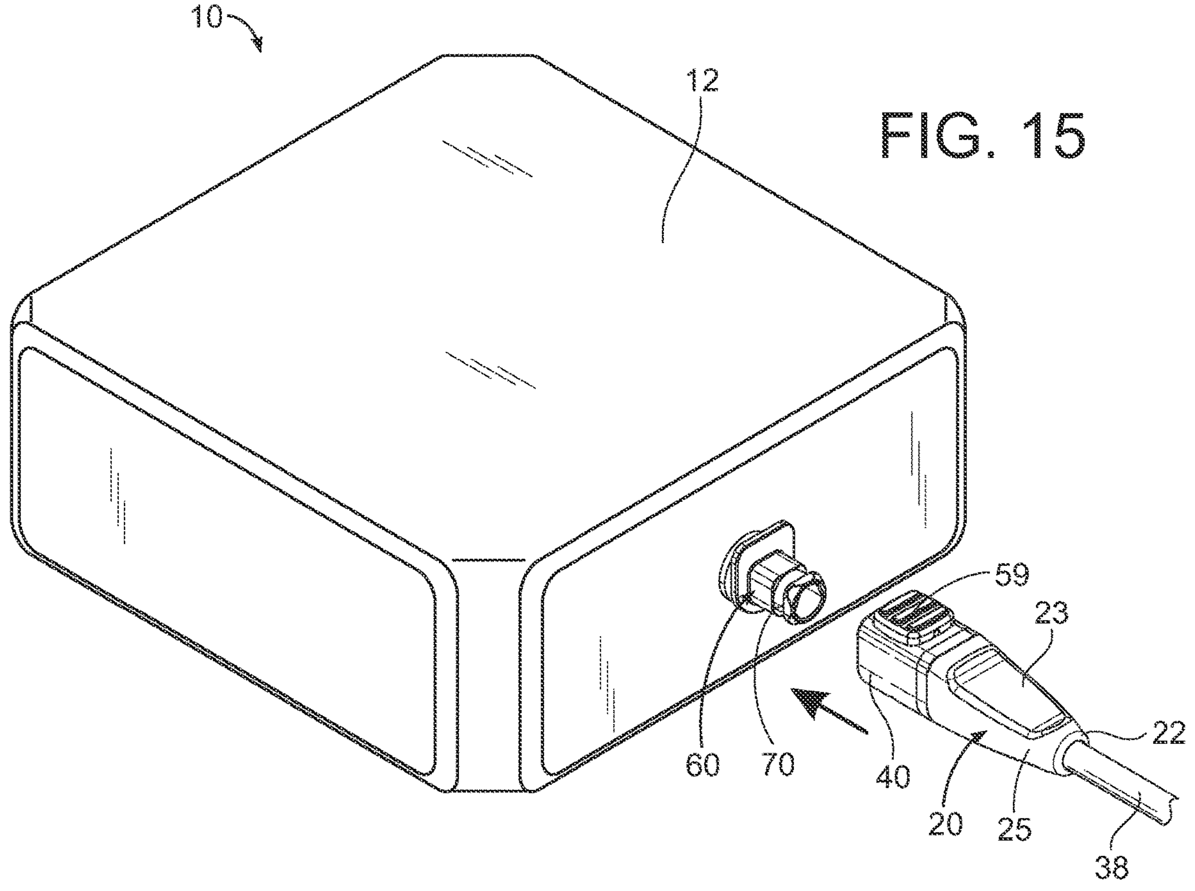
FIG. 15 is a perspective view illustrating a first connector aligned for mechanical engagement with a second connector of a locking connector system in accordance with an example embodiment.
Figure 16:
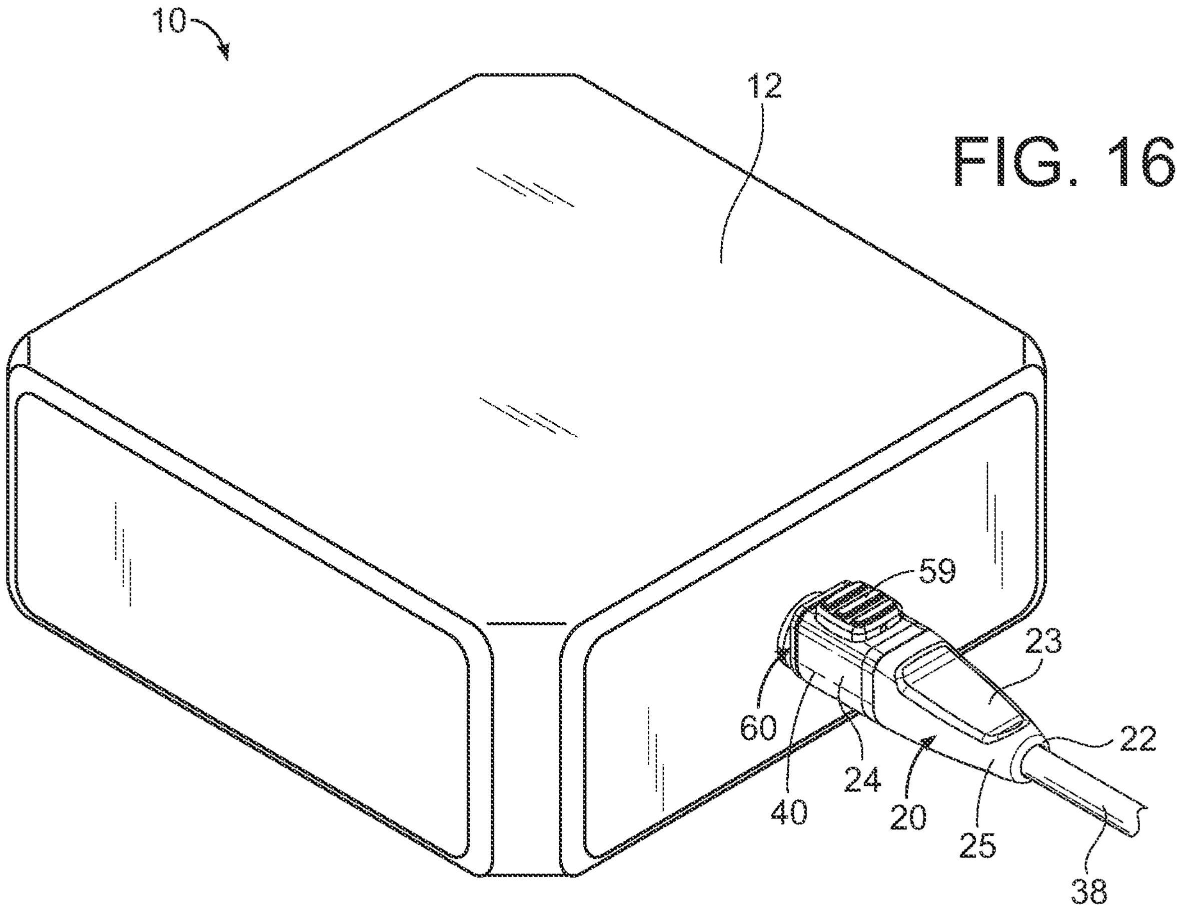
FIG. 16 is a perspective view illustrating a first connector mechanically engaged with a second connector of a locking connector system in accordance with an example embodiment.
Figure 17:
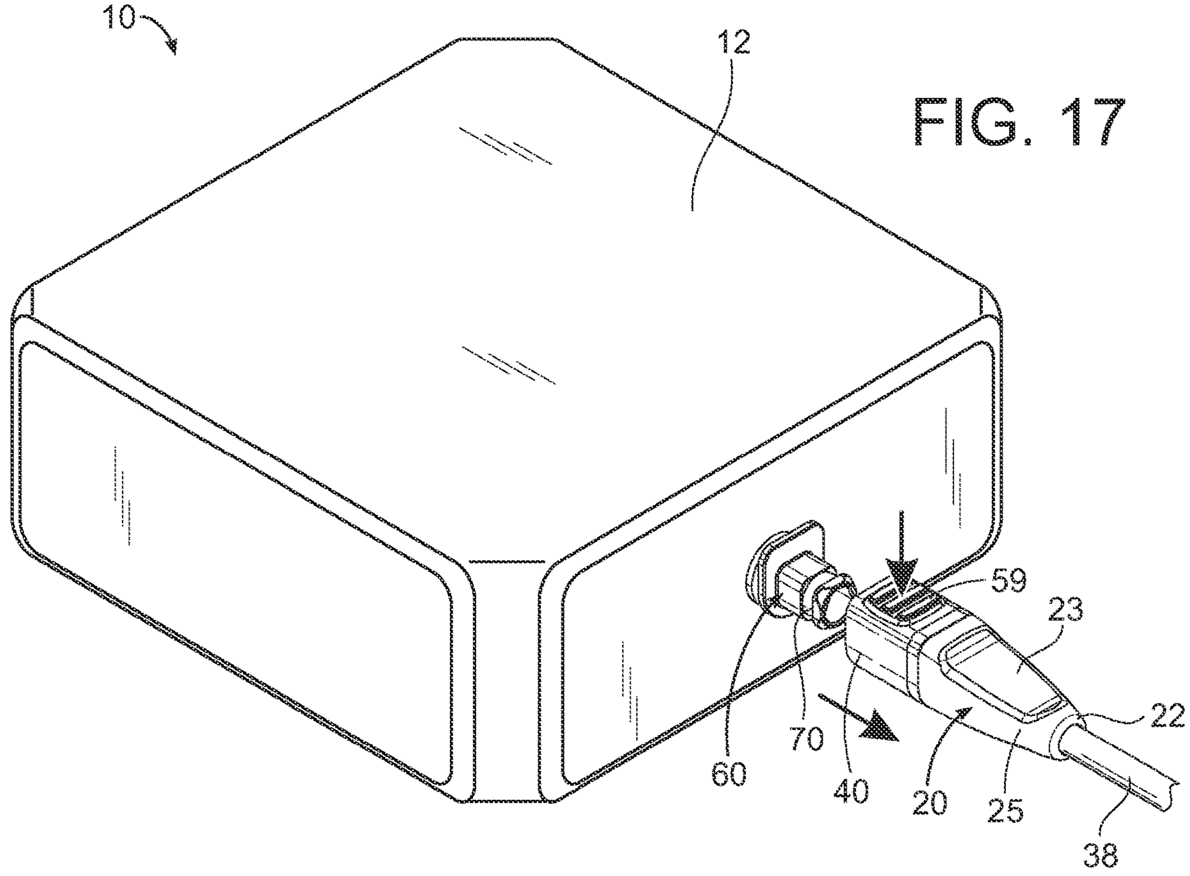
FIG. 17 is a perspective view illustrating a first connector being mechanically disengaged from a first connector of a locking connector system in accordance with an example embodiment.

As shown in FIGS. 15-17, the first connector 20 may comprise a female coupler 40 adapted to receive a corresponding male coupler 70 on a second connector 60. The female coupler 40 will generally form part of the housing 23, but may in some embodiments comprise a discrete structure which is connected to the housing 23. In the embodiment shown in FIG. 1, the housing 23 comprises a front portion 24 and a rear portion 25, with the front portion 24 of the housing 23 comprising the female coupler 40.

As shown in FIG. 1, the female coupler 40 may comprise a front opening 30 adapted to receive the male coupler 70 of the second connector 60. The front opening 30 may comprise various shapes and sizes so long as the front opening 30 is adapted to receive the male coupler 70 of the second connector 60. In the exemplary embodiment in the figures, the front opening 30 comprises a substantially cylindrical shape having a flattened top and a rounded/curved bottom. Such a shape corresponds with the flat top 76 and round bottom 77 of the male coupler 70 as discussed in more detail below.

The female coupler 40 may comprise a tubular member which is either integrated with or connected to the housing 23 of the first connector 20. In the exemplary embodiment shown in the figures, the female coupler 40 comprises a tubular member which forms the front portion 24 of the housing 23. In such an embodiment, the front portion 24 of the housing 23 comprising the female coupler 40 may be removably or fixedly connected to the rear portion 25 of the housing 23, such as through use of mating engagement, fasteners, adhesives, or the like. In other embodiments, the housing 23 may be integrally formed with the female coupler 40.

As shown in FIG. 1, the female coupler 40 is generally positioned at or near the front end 21 of the first connector 20. The female coupler 40 is adapted to receive the corresponding male coupler 70 which is positioned at or near the front end 61 of the second connector 60. The male and female couplers 40, 70 may frictionally engage or may not contact each other directly but instead rely entirely upon the latch 50 for mechanical engagement.

As shown in FIGS. 1-5 and 8, the first connector 20 generally comprises a plurality of first electrically conductive elements 44. The first electrically conductive elements 40 may comprise pins, sockets, or other types of electrically conductive contacts. Generally, the first electrically conductive elements 44 of the first connector 20 are adapted to contact corresponding second electrically conductive elements 64 on the second connector 60 so as to electrically connect the first connector 20 to the second connector 60.

The exemplary embodiment shown in FIG. 8 illustrates usage of a plurality of first electrically conductive elements 44 being comprised of electrical receivers such as sockets or the like adapted to receive corresponding second electrically conductive elements 64 being comprised of electrical connectors such as pins or the like. As shown in FIG. 2, the first connector 20 may thus comprise a pin insert 42 which includes a plurality of pin openings 43 each adapted to receive one of the plurality of second electrically conductive elements 64 of the second connector 60.

Continuing to reference FIG. 2, it can be seen that the pin insert 42 comprises a cylindrical member having a plurality of openings 43 extending from its front end to its rear end. Each of the wires 39 from the cable 38 may extend through the rear end of the pin insert 42 within one of the plurality of openings 43 of the pin insert 42. The shape, size, and configuration of the pin insert 42 may vary in different embodiments. In some embodiments, the pin insert 42 may be integrally formed with the housing 23. In other embodiments, the pin insert 42 may be inserted within the cavity 27 of the housing 23.

Each of the plurality of openings 43 of the pin insert 42 may include a first electrically conductive element 44 positioned therein such that, when a second electrically conductive element 64 such as a pin is inserted within an opening 43 of the pin insert 42, the second electrically conductive element 64 is inserted within a first electrically conductive element 44 so as to electrically connect the second electrically conductive element 64 to the first electrically conductive element 44.

The orientation, positioning, and number of first electrically conductive elements 44 present in the pin insert 42 may vary in different embodiments. The figures illustrate the usage of five first electrically conductive elements 44 arranged in a pentagram-shaped orientation. In other embodiments, the electrically conductive elements 44 may be arranged in various other orientations for different types of connectors 20, 60, such as but not limited to circular-shaped, rectangular-shaped, polygonal-shaped, and other shaped orientations of first electrically conductive elements 44.

In the exemplary embodiment shown in FIGS. 2-5, the pin insert 42 comprises a cylindrical insulating member such as a pin plug having a plurality of openings 43 extending through the length of the pin insert 42 between its first and second ends. The figures illustrate the usage of five openings 43 in the pin insert 42, with each of the five openings 43 being adapted to receive a first electrical conductive element 44 such as a conductive socket.

While the figures illustrate the usage of five openings 43 arranged in a pentagon-shape orientation, it should be appreciated that more or less openings 43 may be utilized in various orientations and arrangements. Similarly, the positioning and orientation of the openings 43 may vary to accommodate different types of first electrically conductive elements 44. For example, the openings 43 may be oriented in a circular, rectangular, or polygonal orientation in some embodiments.

C. Latch

As shown in FIGS. 4-7, the locking connector system 10 may comprise a latch 50 which is utilized to selectively lock the first connector 20 in mechanical engagement with the second connector 60. The latch 50 may be movably connected to the first connector 20, with the second connector 60 comprising a catch portion 74 to which the latch 50 may be engaged. When the latch 50 is so engaged, adjustment of the latch 50, such as by moving the latch 50 downwardly, may disengage the latch 50 so that the first connector 20 may be mechanically disengaged from the second connector 60.

Figure 4:
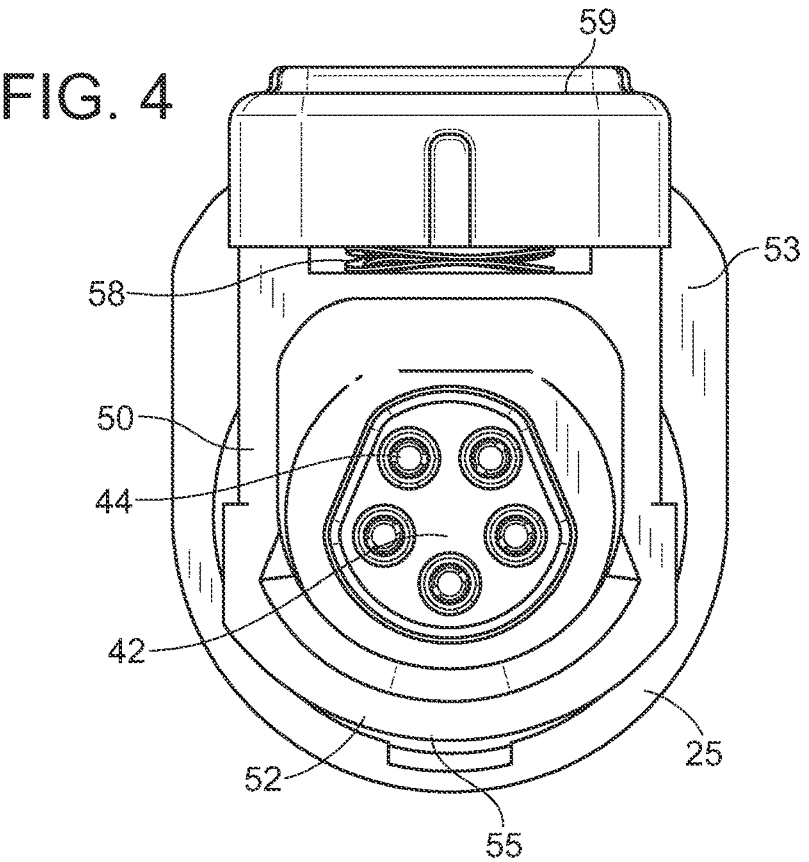
FIG. 4 is a front cutaway view of a first connector of a locking connector system with the button and latch in the raised position in accordance with an example embodiment.
Figure 5:
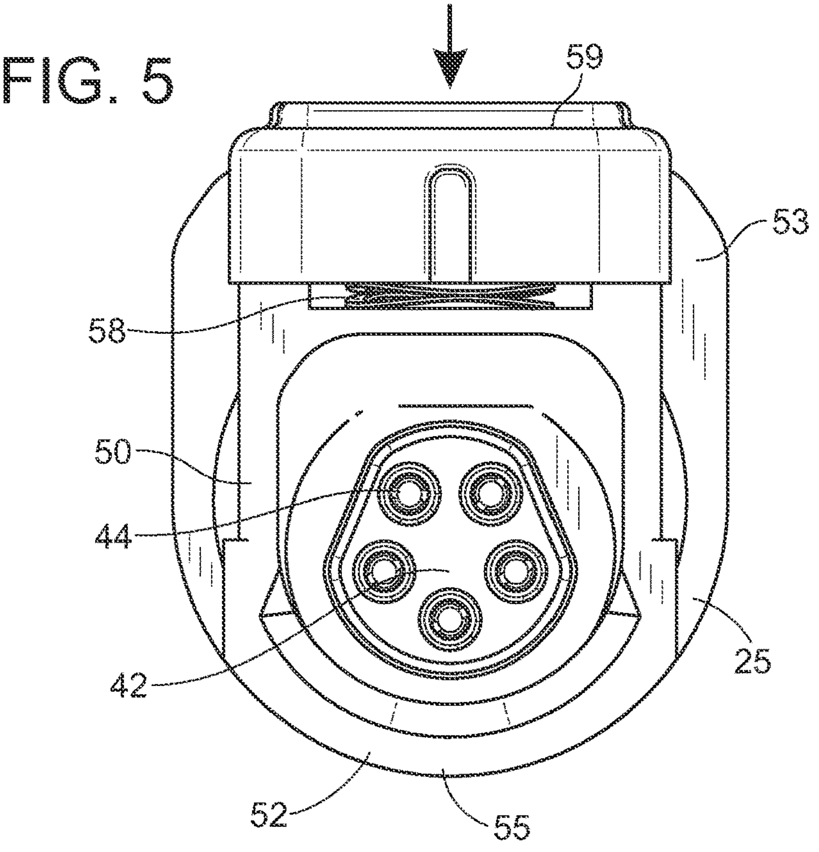
FIG. 5 is a front cutaway view of a first connector of a locking connector system with the button and latch in the lowered, depressed position in accordance with an example embodiment.
Figure 6:
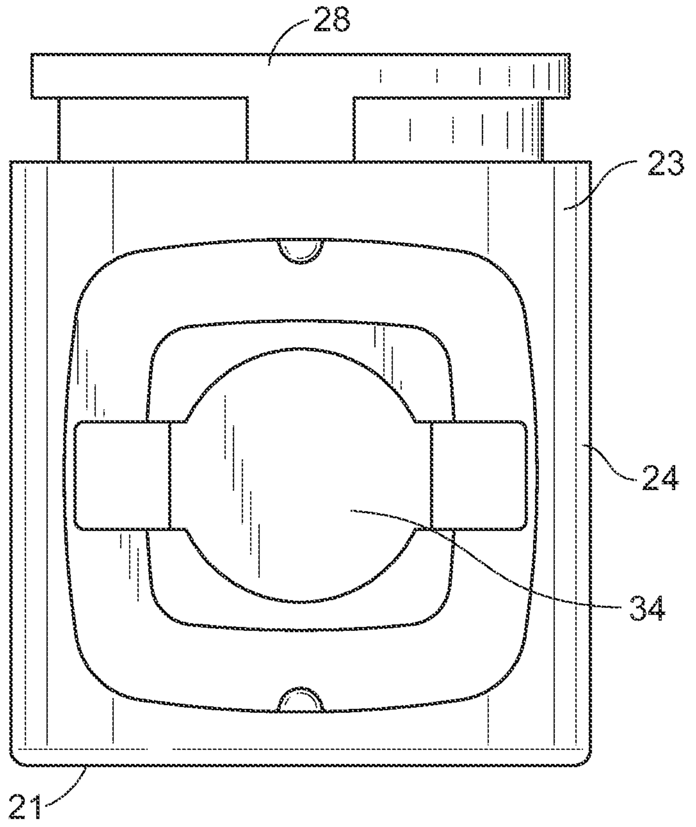
FIG. 6 is a top view of a first connector of a locking connector system in accordance with an example embodiment.

As shown in FIGS. 4 and 5, the latch 50 will generally be movably positioned or connected to the first connector 20. In the exemplary embodiments shown in the figures, the latch 50 is movably connected within the cavity 27 of the housing 23 of the first connector 20. As shown in FIGS. 4 and 5, the latch 50 may be positioned within the housing 23 so as to extend around the first electrically conductive elements 44.

Figure 7:
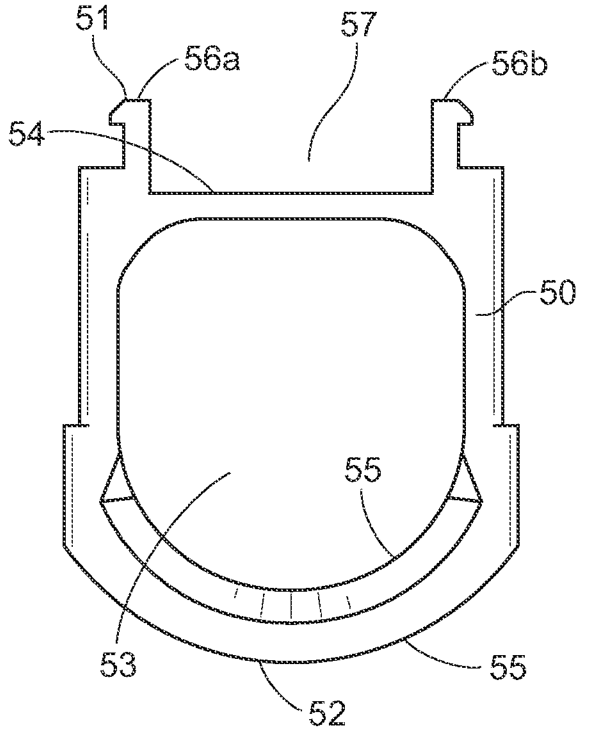
FIG. 7 is a front view of a latch of a first connector of a locking connector system in accordance with an example embodiment.

An exemplary embodiment of a latch 50 for use with the locking connector system 10 is shown in FIG. 7. As shown, the latch 50 comprises an upper end 51, a lower end 52, and a central opening 53 defined between the upper and lower ends 51, 52. A button 59 may be positioned on the upper end 51 of the latch 50 such that, when the button 59 is pressed downwardly, the latch 50 similarly moves downwardly within the housing 23. The bias member 58 may be connected between the upper end 51 of the latch 50 and the button 59 such that, when the button 59 is released, both the button and the latch 50 move upwardly.

The upper end 51 of the latch 50 may comprise a flat outer upper edge 54 which is horizontal or substantially horizontal such as shown in FIG. 7. The bias member 58 may be positioned against the outer upper edge 54 of the latch 50. In the exemplary embodiments shown in FIG. 7, the outer upper edge 54 of the latch 50 comprises a pair of flanges 56*a*, 56*b* which extend upwardly from the upper end 51 of the latch 50, with the first flange 56*a* being positioned at or near the first side of the upper edge 54 of the latch 50 and the second flange 56*b* being positioned at or near the second side of the upper edge 54 of the latch 50.

Figure 20A:
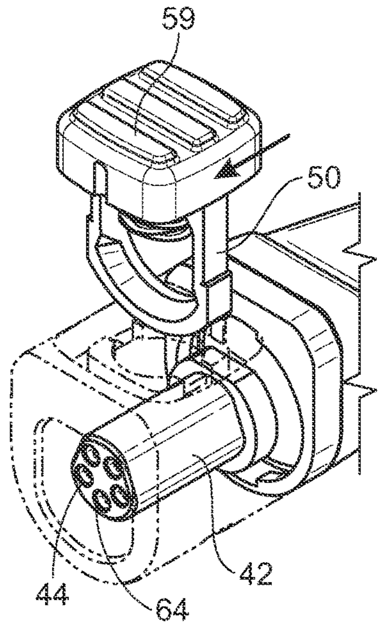
FIG. 20A is a perspective view of a first exemplary embodiment of a first connector of a locking connector system in accordance with an example embodiment.
Figure 20B:
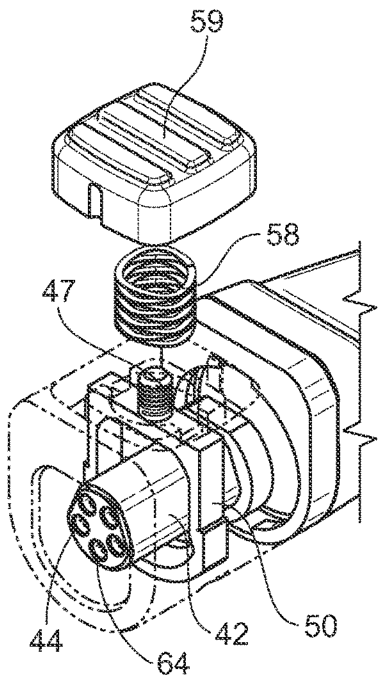
FIG. 20B is a perspective view of a second exemplary embodiment of a first connector of a locking connector system in accordance with an example embodiment.
Figure 20C:
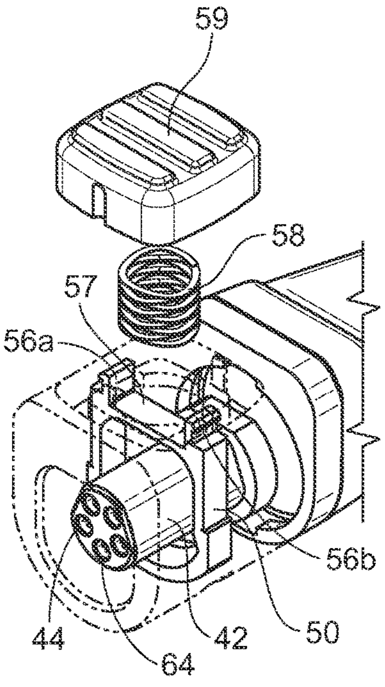
FIG. 20C is a perspective view of a third exemplary embodiment of a first connector of a locking connector system in accordance with an example embodiment.

The upper distal ends of the flanges 56*a*, 56*b* may include locking features to which the button 59 may be connected such as shown in FIGS. 20B and 20C. In an alternate embodiment, the outer upper edge 54 of the latch 50 may instead comprise a fastener 47 such as a threaded bolt or other type of projection to which the button 59 may be connected such as shown in FIG. 20B. In such an embodiment, the bias member 58 may be positioned around the fastener 47.

With reference to FIG. 7, it can be seen that the lower end 52 of the latch 50 may comprise an inner lower edge 55 which is curved inwardly and faces upwardly towards the central opening 53. The inner lower edge 55 may include a tapered face such as shown in FIG. 7, with the tapered face being configured to aid the latch 50 in traversing over the ramp 79 when being connected.

The inner lower edge 55 of the latch 50 is comprised of the edge of the latch 50 facing the central opening 53 as best shown in FIG. 7. The inner lower edge 55 of the latch 50 may be adapted to engage within the catch portion 74 of the male coupler 70 as discussed in more detail below. The latch 50 may thus include a central opening 53 into which the male coupler 70 will extend when the first and second connectors 20, 60 are mechanically coupled. The size and shape of the central opening 53 may vary depending on the size and shape of the male coupler 70, with the exemplary embodiment of FIG. 7 illustrating an opening with a flat upper edge and a curved lower edge.

When the first and second connectors 20, 60 are mechanically engaged, the male coupler 70 extends through the central opening 53 of the latch 50. The inner lower edge 55 of the latch 50 will engage with the catch portion 74 of the male coupler 70 and remain in such a position until the latch 50 is adjusted downwardly to release the inner lower edge 55 of the latch 50 from the catch portion 74 such that the inner lower edge 55 of the latch 50 may pass over the flange 75 of the male coupler 70 and the male coupler 70 may be removed from within the central opening 53.

As shown throughout the figures, the latch 50 may include a bias member 58 which is connected between the latch 50 and the button 59. The bias member 58 functions to link the button 59 and the latch 50 such that, when the button 59 is depressed, the latch 50 slides or otherwise moves downwardly with the button 59. In this manner, when the button 59 is pressed down, the latch 50 is pressed down. When the button 59 is released, the bias member 58 will push the button 59 back upwardly, with the latch 50 similarly adjusting upwardly.

A wide range of bias members 58 may be utilized with the latch 50. FIGS. 22A, 22B, 22C, and 22D illustrate exemplary embodiments of bias members 58 for use with the latch 50, though it should be appreciated that such exemplary embodiments are merely for illustrative purposes and thus should not be construed as limiting in scope. The shape, size, and type of bias member 58 used may vary in different embodiments.

Figure 22A:
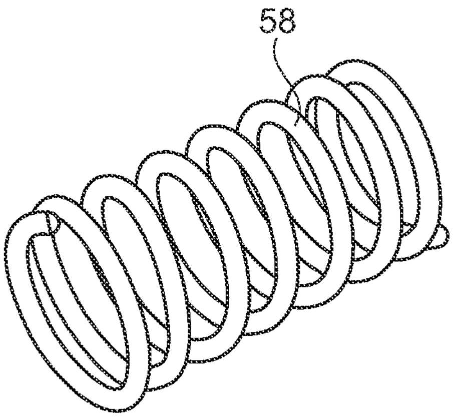
FIG. 22A is a perspective view of a first exemplary bias member of a locking connector system in accordance with an example embodiment.
Figure 22B:
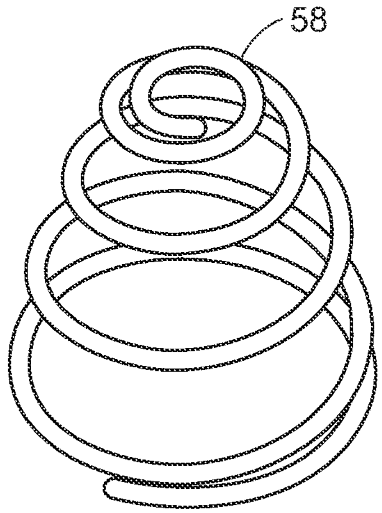
FIG. 22B is a perspective view of a second exemplary bias member of a locking connector system in accordance with an example embodiment.
Figure 22C:
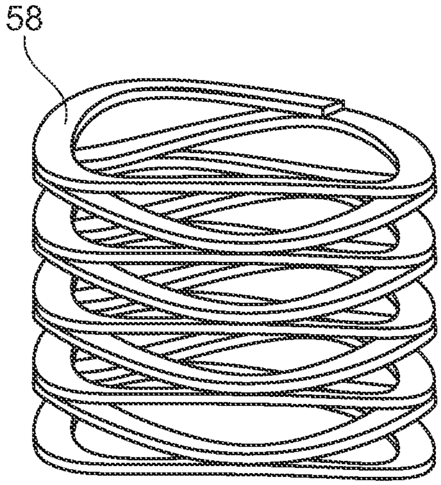
FIG. 22C is a perspective view of a third exemplary bias member of a locking connector system in accordance with an example embodiment.
Figure 22D:
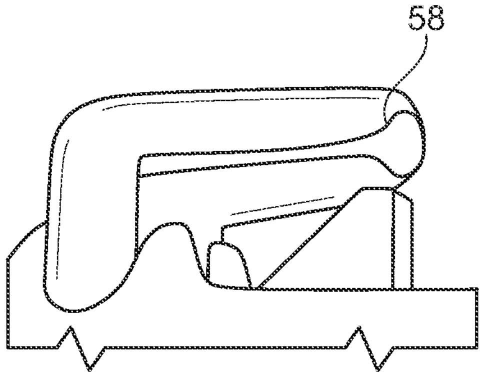
FIG. 22D is a perspective view of a fourth exemplary bias member of a locking connector system in accordance with an example embodiment.

FIG. 22A illustrates the bias member 58 being comprised of a standard compression spring including a cylindrical coil of spring. Such an embodiment is ideal for the embodiment of the locking connector system 10 shown in FIG. 20B in which the coil spring may be positioned around the fastener 47 of the latch 50. FIG. 22B illustrates the bias member 58 being comprised of a dome spring. FIG. 22C illustrates the bias member 58 being comprised of a wave spring. FIG. 22D illustrates the bias member 58 being comprised of a plastic beam spring.

The manner in which the latch 50, button 59, and bias member 58 are interconnected may vary in different embodiments. FIG. 20A illustrates an embodiment in which the latch 50 and button 59 are integrally formed, with the bias member 58 being secured between the upper edge 54 of the latch 50 and the button 59.

FIG. 20B illustrates an embodiment in which the upper edge 54 on the upper end 51 of the latch 50 includes a fastener 47 such as a bolt, nut, or screw. The button 59 is connected at its lower end to the upper end of the fastener 47, such as by frictional or threaded engagement. The bias member 58 is positioned to surround the fastener 47 and be sandwiched between the upper edge 54 of the latch 50 and the lower end of the button 59.

FIG. 20C illustrates an embodiment in which the upper edge 54 of the upper end 51 of the latch 50 includes a pair of flanges 56*a*, 56*b* which serve as mounting points for the button 59. A first flange 56*a* is shown on a first side of the upper edge 54 of the upper end 51 of the latch 50 and a second flange 56*b* is shown on a second side of the upper edge 54 of the upper end 51 of the latch 50. The first and second flanges 56*a*, 56*b* may comprise locking features such as hooks or other projections adapted to engage to the lower end of the button 59. The bias member 58 may be positioned in the depressed portion 57 defined between the flanges 56*a*, 56*b*.

The manner in which the latch 50 is adjusted may also vary in different embodiments. Generally, the latch 50 is movably positioned or connected within the housing 23 of the first connector 20. In the embodiment shown in the figures, the latch 50 is movable between a first, raised position and a second, lowered position. In other embodiments, the latch 50 may be movable in other directions or in other manners.

The latch 50 is generally adjusted by pressing down on the button 59 which extends out of the upper opening 34 of the housing 23 of the first connector 20. Since the latch 50 is connected to the button 59, when the button 59 is pressed downwardly, the latch 50 similarly moves downwardly within the cavity 23 of the housing 23.

The bias member 58, which is positioned between the upper end 51 of the latch 50 and the button 59, also aids in forcing the latch 50 downwardly when the button 59 is pressed downwardly. The button 59 also functions to return the button 59, and by extension the latch 50, to its original, raised position absent the application of force. In other words, when the button 59 is released by the operator, both the button 59 and the latch 50 will move upwardly to their original, resting positions.

The latch 50 functions by selectively engaging with the male coupler 70 to releasably lock the first connector 20 in mechanical engagement with the second connector 60. As shown in FIG. 4, the latch 50 remains in its resting position absent application of any force. When the male coupler 70 is inserted within the female coupler 40, the male coupler 70 will be inserted through the central opening 53 of the latch 50.

The inner lower edge 55 of the latch 50 will contact the engagement portion 78 of the male coupler 70, with the latch 50 passing over the ramp 79 of the engagement portion 78. When passing over the ramp 79 and engagement portion 78 of the male coupler 70, the latch 50 will move or adjust upwardly slightly within the cavity 27 of the housing 23 such that the latch 50 may pass over the engagement portion 78. The latch 50 will then engage within the catch portion 74 of the male coupler 70 and be locked in such a position by the flange 75. Thus, pulling backwardly on the first connector 20 will not disengage the first connector 20 from the second connector 60, as the lower end 52 of the latch 50 will catch upon the flange 75.

To disengage the latch 50, the button 59 is first pressed downwardly, which will push the latch 50 downwardly such that the lower end 52 of the latch 50 disengages from within the catch portion 74 of the male coupler 70. The latch 50 may then slide over the flange 75 to be released from engagement with the male coupler 70. In this manner, the first connector 20 may be disconnected from the second connector 60. Releasing the button 59 will return both the button 59 and the latch 50 to their original, raised positions due to action of the bias member 58.

As shown in FIGS. 21A and 21B, the first connector 20 may include a lower opening 56 which functions as both a visual and tactile indicator to enable an operator to easily be able to determine whether the latch 50 is in its raised or lowered position by simply viewing the housing 23 of the first connector 20. The lower opening 56 may comprise a window or other type of opening formed in the lower end of the housing 23. The shape, size, and configuration of the lower opening 56 may vary and thus should not be construed as limited by the exemplary figures.

An operator may utilize the lower opening 36 of the housing 23 of the first connector 20 as both a visual and tactile indicator of the status of the latch 50. When the latch 50 is in its raised position, the latch 50 will either not extend into the lower opening 36 of the housing 23 at all, or the latch 50 will only partially extend into the lower opening 36 of the housing 23. When the latch 50 is in its lowered position, the latch 50 will be lowered so as to fill at least a majority of the lower opening 36, with some embodiments utilizing a latch 50 which may be lowered to be flush with, or even extend past, the lower opening 36 of the housing 23.

To check the status of the latch 50, the operator of the locking connector system 10 may view the lower opening 36 of the housing 23. The positioning of the latch 50 within the lower opening 36 of the housing 23 will be indicative of its position. If the operator sees that the latch 50 has been lowered within the lower opening 36 so as to partially or completely fill the lower opening 36, the operator will recognize that the latch 50 is not in its raised position and thus may not be engaged within the catch portion 74 of the second connector 60.

In some situations, it may be difficult to view the lower opening 36 of the housing 23 when the connectors 20, 60 are engaged. In such situations, an operator need only run his or her finger over the lower opening 36 of the housing 23 to determine the position of the latch 50. If the operator can feel the lower end 51 of the latch 50 within the lower opening 36 of the housing 23, the operator can ascertain that the latch 50 is in its lowered position. If the operator cannot feel the lower end 51 of the latch 50 within the lower opening 36 of the housing 23, the operator can ascertain that the latch 50 is in its raised position.

FIG. 21A illustrates the first connector 20 with the latch 50 and button 59 in the raised position. As can be seen, the lower end 52 of the latch 50 is only partially visible within the lower opening 36 of the housing 23, with the lower opening 36 being only partially filled by the lower end 52 of the latch 50. In some embodiments, the latch 50 may not be visible at all in the lower opening 36 when the latch 50 is in its raised position.

FIG. 21B illustrates the first connector 20 with the latch 50 and button 59 pressed down into the lowered position. As can be seen the lower end 52 of the latch 50 is positioned to fill the lower opening 36 of the housing 23. In some embodiments, the lower end 52 of the latch 50 may extend past the lower end of the lower opening 36 of the housing 23 when depressed. In other embodiments, the lower end 52 of the latch 50 may only partially extend into the lower opening 36 of the housing 23 when depressed. In either case, an operator need only view the lower opening 36 of the housing 23 to determine quickly whether the latch 50 is in its raised or lowered position.

The lower opening 36 of the housing 23 provides visual feedback to confirm for the operator that the latch 50 has returned fully to its original position when the button 59 is released. By viewing the lower opening 36, an operator may easily ascertain whether the button 59 and latch 50 have fully returned to their original position, or whether they have become caught at a mid-point.

The latch 50 may also provide both tactile and audible feedback when returning to its original, raised position. The tactile feedback is provided when the latch 50 snaps onto the male coupler 70, which will provide mechanical, tactile feedback in the force of a tapping force which resonates through the housing 23 of the first connector 20. The tapping force may be felt by an operator holding the housing 23 as a click or the like.

At the same time, an audible click will be emitted when the latch 50 snaps onto the male coupler 70 which provides audible feedback for the operator. The sound of the click will indicate that the latch 50 is fully engaged. The absence of such a click will indicate a fault or other malfunctions, such as the latch 50 not fully returning to its original position to engage with the male coupler 70.

By using a combination of audible and tactile feedback from the latch 50 engaging with the catch portion 74 of the second connector 60 and visual and tactile feedback from the lower opening 36, the locking connector system 10 enables an operator to ensure that the latch 50 is fully engaged with the male coupler 70 when the first and second connectors 20, 60 are mechanically engaged. Such a feature prevents operators from walking away from connectors 20, 60 that are not fully mechanically engaged. In this manner, partial mechanical connections which may result in the premature or unwanted disengagement of the mechanical connection 20, 60 between the first and second connectors 20, 60 may be quickly recognized by the operator and fixed accordingly.

D. Second Connector

FIGS. 9-14 illustrate an exemplary second connector 60 comprising a male coupler 70. The second connector 60 comprises housing 63 having a front end 61 and a rear end 62. The rear end 62 of the housing 63 may be connected to a component 12 such as an electrical device. Such an electrical device may comprise, without limitation, computer systems, tablet computers, peripheral accessories such as printers, scanners, and the like, monitors, medical devices, power connectors, mobile phones, and the like. In other embodiments, the housing 63 may be connected instead to a wall to function as a wall socket. In yet other embodiments, the rear end 62 of the housing 63 of the second connector 70 may be connected to a cable 38.

As shown in FIGS. 9 and 12-14, the second connector 60 may comprise a housing 63 including a male coupler 70 which is adapted to engage within the corresponding female coupler 40 of the first connector 20. The male coupler 70 is generally positioned at the front end 61 of the second connector 60, with the rear end 62 of the second connector 60 being connected to a component 12 such as an electrical device, a wall, or a cable 38. In any case, a plurality of wires 39 will generally enter the housing 63 via its rear end 62 to connect to a plurality of second electrically conductive elements 64.

Figure 11:
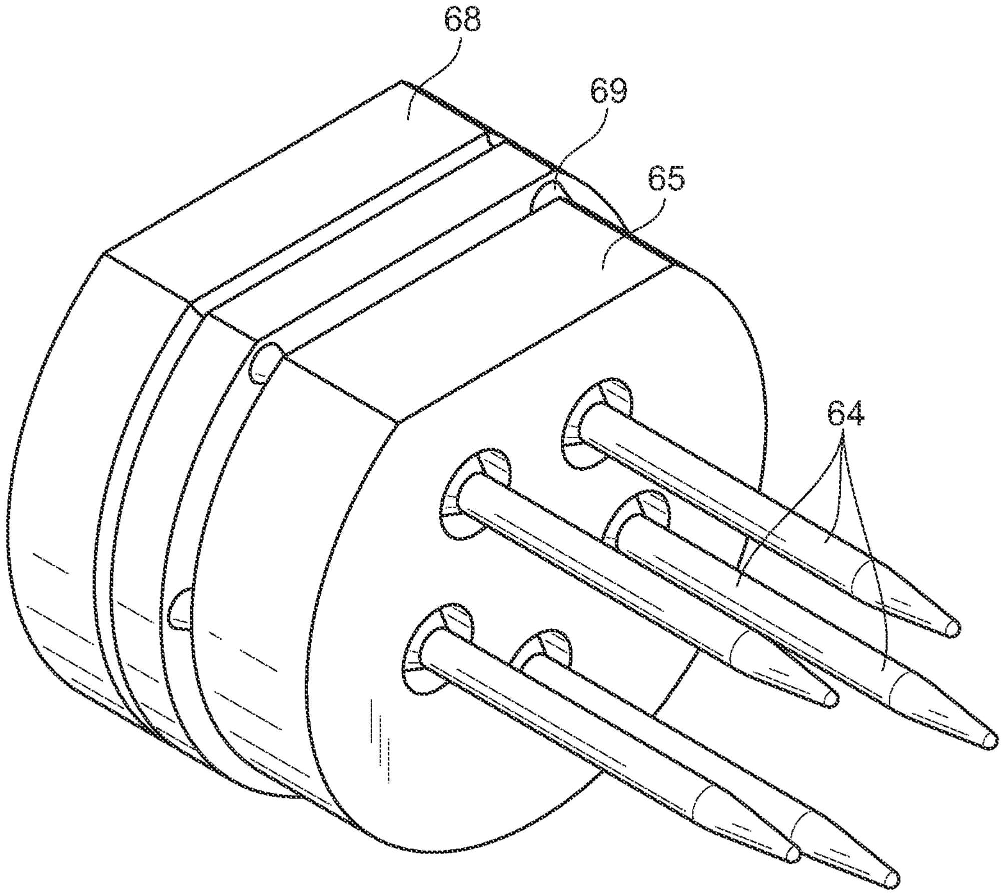
FIG. 11 is a perspective view of a connector hub and pins of a second connector of a locking connector system in accordance with an example embodiment.
Figure 12:
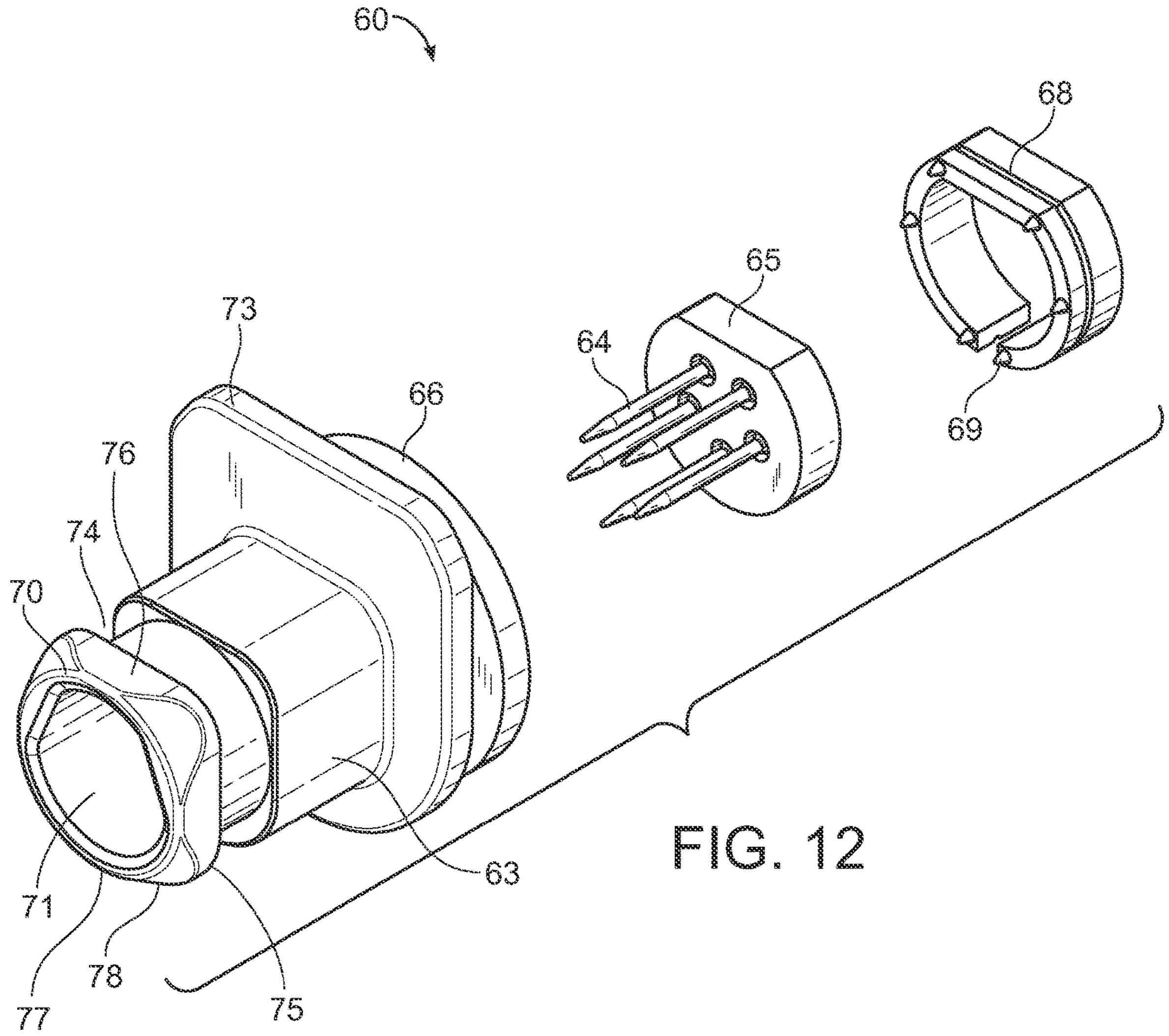
FIG. 12 is an exploded view of a second connector of a locking connector system in accordance with an example embodiment.
Figure 13:
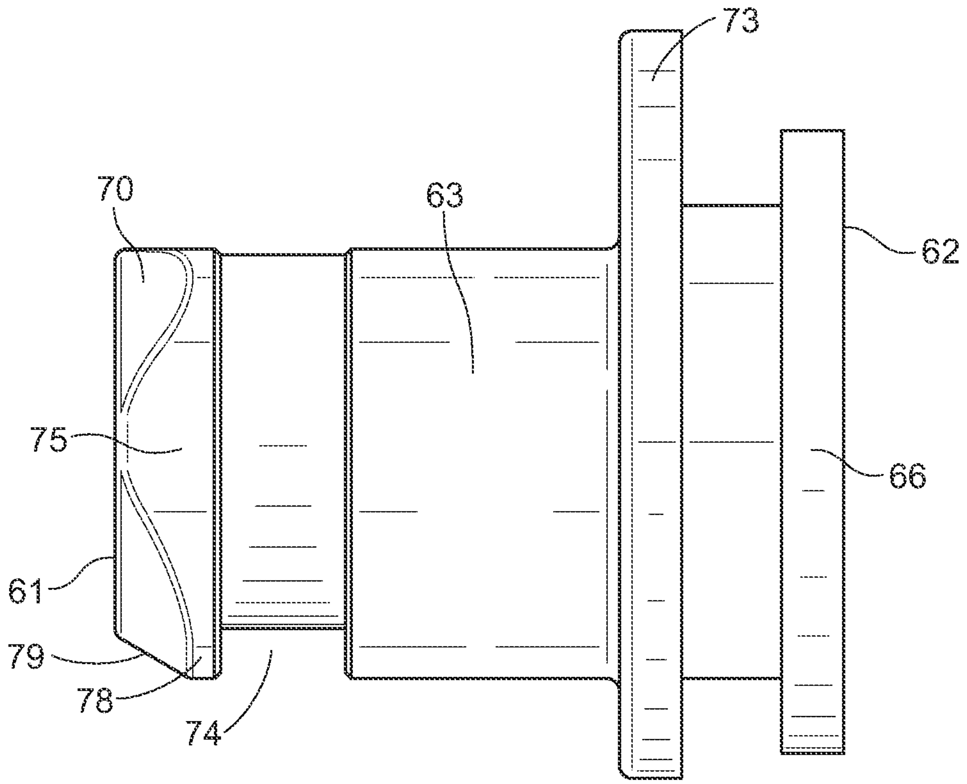
FIG. 13 is a side view of a second connector of a locking connector system in accordance with an example embodiment.
Figure 14:
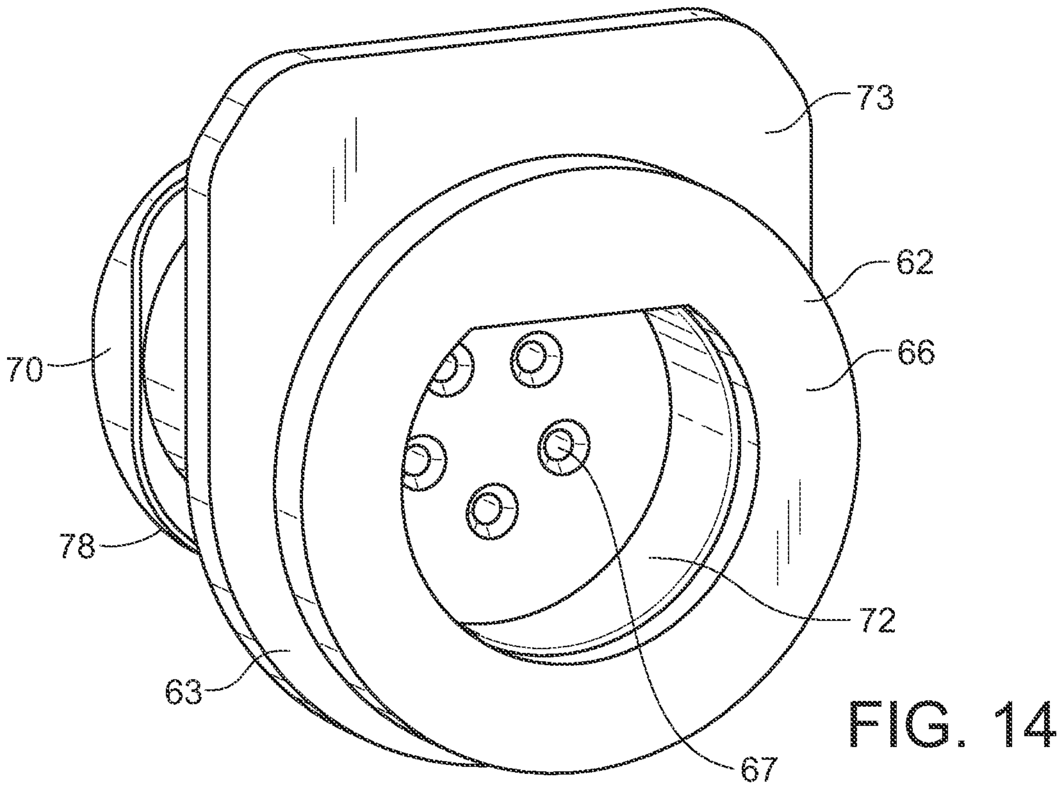
FIG. 14 is a rear perspective view of a housing of a second connector of a locking connector system in accordance with an example embodiment.

FIG. 11 illustrates an exemplary embodiment of a plurality of second electrically conductive elements 64. In such an embodiment, each of the second electrically conductive elements 64 is comprised of a pin. It should be appreciated, however, that the second electrically conductive elements 64 may comprise various types of electrical contacts, such as but not limited to pins, sockets, electrodes, or the like.

Figure 10:
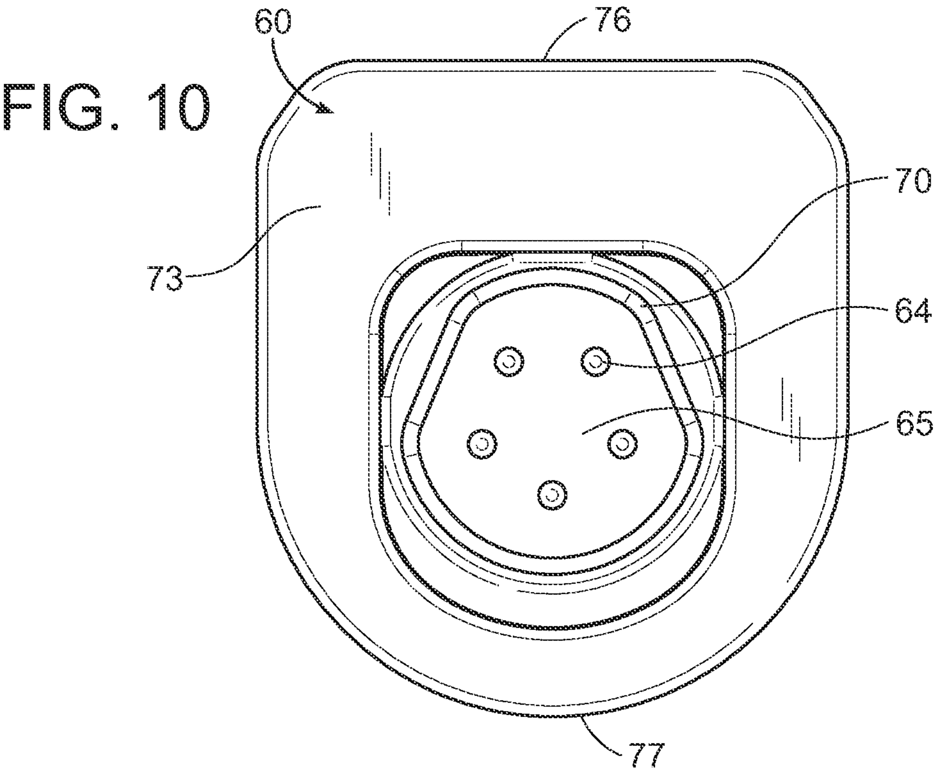
FIG. 10 is a front view of a second connector of a locking connector system in accordance with an example embodiment.

Generally, the second electrically conductive elements 64 on the second connector 60 are adapted to contact corresponding first electrically conductive elements 44 of the first connector 20 so as to electrically connect the first connector 20 to the second connector 60. The exemplary embodiment shown in FIG. 10 illustrates usage of a plurality of second electrically conductive elements 64 being comprised of electrical connectors such as pins or the like adapted to engage within corresponding first electrically conductive elements 44 being comprised of electrical receivers such as sockets or the like.

The second electrically conductive elements 64 may be internal or external with respect to the housing 63 of the second connector 60. In the embodiment shown in the figures, the second electrically conductive elements 64 are recessed within the front opening 71 of the male coupler 70 of the second connector 60. However, in some embodiments, the second electrically conductive elements 64 may instead be external, extending outwardly from the front end 61 of the second connector 60. In other embodiments, the second electrically conductive elements 64 may be partially within the housing 63 and partially external to the housing 63.

FIG. 11 illustrates a connector hub 65 to which the second electrically conductive elements 64 may be connected, with the connector hub 65 being positioned within the housing 63 of the second connector 60. The connector hub 65 may comprise an insulating base having a plurality of pin openings 67 which extend between the front end and rear end of the connector hub 65. The rear end of the pin openings 67 may receive wires 39 which are inserted within the connector hub 65 from its rear end to connect within the pin openings 67 with corresponding second electrically conductive elements 64. A retainer 68 such as a snapping feature may be connected to the rear end of the connector hub 65 to secure the connector hub 65 to the housing 63. The retainer 68 may include projections 69 which aid in snapping the retainer to the connector hub 65 such as shown in FIG. 11. As shown in FIGS. 9 and 12-14, the second connector 60 may comprise a male coupler 70 which is adapted to engage within the latch 50 and the female coupler 40 of the first connector 20. The shape, size, and configuration of the male coupler 70 may vary in different embodiments. In the exemplary embodiment shown in the figures, the male coupler 70 comprises a projecting extension having a front end 61 and a rear end 62. The male coupler 70 may include a base 73 comprising a flange or the like which serves as a stopper to prevent over-insertion of the male coupler 70. The rear end 62 of the male coupler 70 may include a mount 66 which is used to secure the male coupler 70 and housing 63 to a component 12, wall, or the like.

Figure 9:
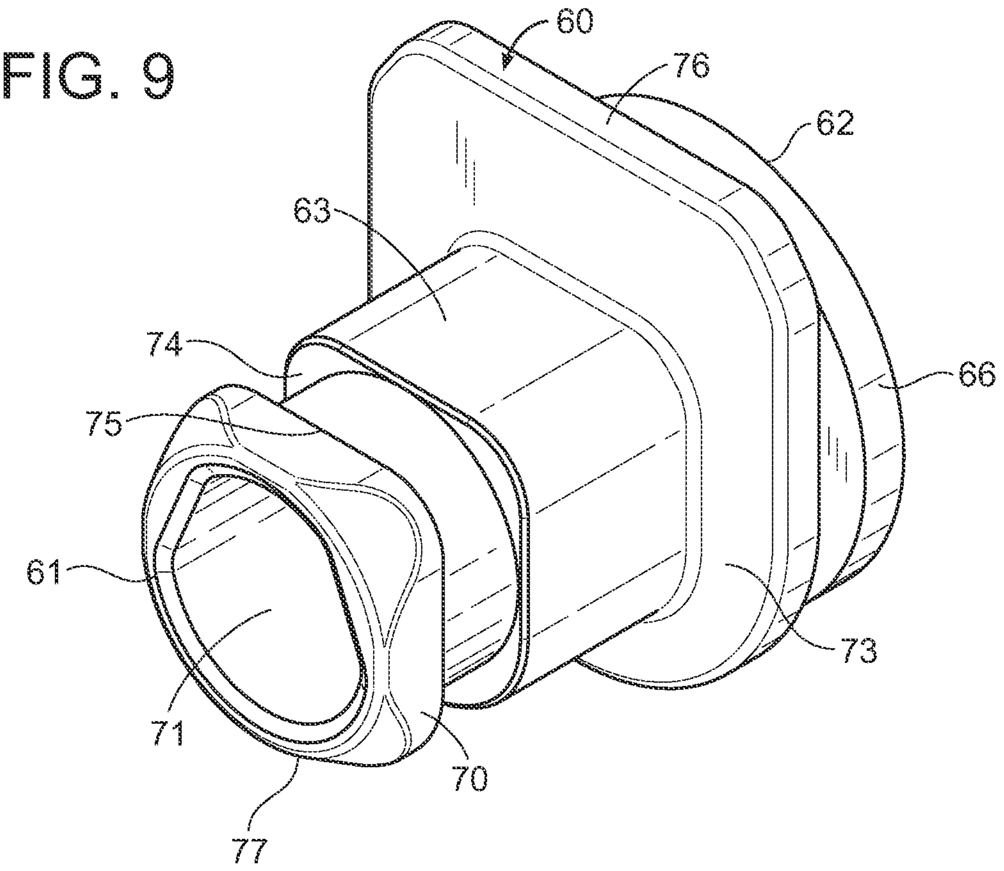
FIG. 9 is a perspective view of a second connector of a locking connector system in accordance with an example embodiment.

As shown in FIG. 9, the male coupler 70 may comprise a cylindrical or other-shaped extension having a catch portion 74 comprised of a depressed band or groove which surrounds the male coupler 70. A flange 75 is positioned adjacent to the catch portion 74, with the catch portion 74 being defined between the flange 75 and the male coupler 70 body. The catch portion 74 is sized and shaped so as to receive and releasably engage the latch 50 as discussed herein. When engaged, the lower end 52 of the latch 50 rests within the catch portion 74 of the male coupler 70 and is prevented from disengagement by the flange 75. Only by adjusting the latch 50 downwardly to disengage the latch 50 from the catch portion 74 and flange 75 may the male coupler 70 be released from within the female coupler 40.

Continuing to reference FIG. 9, it can be seen that the male coupler 70 comprises an upper edge 76 and a lower edge 77. The upper edge 76 of the male coupler 70 is shown as comprising a flat edge. The lower edge 77 of the male coupler 70 is shown as comprising an outwardly curved edge. The lower edge 77 of the male coupler 70 comprises an engagement portion 78 over which the inner lower edge 55 of the latch 55 will pass over when the latch 50 is being engaged over the catch portion 74 of the male coupler 70. The engagement portion 78 may comprise a ramp 79 which guides the latch 50 over the flange 75 and engagement portion 78 to engage within the catch portion 74 of the male coupler 70 as discussed herein.

As shown in FIG. 9, the male coupler 70 may comprise a front opening 71 at or near its front end 61 which is adapted to receive the female coupler 40 of the first connector 20. The shape and size of the front opening 71 may vary so as to match with the shape and size of the pin insert 42 of the female coupler 40 such that the pin insert 42 may snugly fit within the front opening 71 so that the electrically conductive elements 44, 64 may be electrically connected. The male coupler 70 may also include a rear opening 72 at its rear end 62 for receiving the wires 39.

E. Operation of Preferred Embodiment

In use, the locking connector system 10 is adapted to releasably lock the first and second connectors 20, 60 in mechanical, mated engagement when the male coupler 70 of the second connector 60 is inserted within the female coupler 40 of the first connector 20. The first connector 20 utilizes a latch 50 which engages with a catch portion 74 of the male coupler 70 and prevents premature disengagement through use a flange 75. The connectors 20, 60 may be released from being locked to mechanically disengage by depressing the button 59 on the first connector 20, which moves the latch 50 such that the latch 50 may be removed from around the male coupler 70 over the flange 75.

To ensure that operators are aware of whether the connectors 20, 60 are locked or released, the first connector 20 may provide multiple types of feedback to indicate that the connectors 20, 60 are locked together. Though the connectors 20, 60 may appear to be coupled, there is the possibility that the latch 50 has not fully engaged with the catch portion 74 which would prevent the connectors 20, 60 from being locked. It is only when the latch 50 has passed over the flange 75 and snapped onto the catch portion 74 that the connectors 20, 60 are locked together. If the latch 50 does not fully pass over the flange 75, the latch 50 will not engage with the catch portion 74 and the connectors 20, 60, though they may appear to be connected, will not be locked together.

A tactile feedback is provided in the form of a snapping force which is imparted to the housing 23 when the latch 50 snaps onto the male coupler 70. The operator can feel when the latch 50 snaps onto the catch portion 74 of the second connector 60. An audible feedback is provided in the form of a clicking sound which is audible when the latch 50 snaps onto the male coupler 70. The operator can hear when the latch 50 snaps onto the catch portion 74 of the second connector 60.

The lower opening 36 of the housing 23 of the first connector 20 may also provide both tactile and visual feedback to indicate that the connectors 20, 60 are locked together. The latch 50 will adjust or move within the lower opening 36 when the latch 50 is moved upwardly or downwardly. When the latch 50 is pushed downwardly, such as when passing over the flange 75, the lower end 51 of the latch 50 will advance within the lower opening 36 of the housing 23 of the first connector 20 so as to either substantially fill the lower opening 36, completely fill the lower opening 36, or extend past the lower opening 36.

The operator can view the lower opening 36 to easily determine the status of the 2 latch 50. If the latch 50 is visible as covering at least a substantial portion of the lower opening 36, it can be ascertained that the latch 50 has not returned to its raised position and thus the lower end 51 of the latch 50 may not have passed over the flange 75. If the latch 50 is visible as being retracted from the lower opening 36 such that the lower end 51 of the latch 50 is either only partially within the lower opening 36, or not within the lower opening 36 at all, it can be ascertained that the latch 50 has returned to its original, raised position and thus the lower end 51 of the latch 50 has passed over the flange 75 and engaged within the catch portion 74 of the male coupler 70.

The operator can also feel the lower opening 36 to easily determine the status of the latch 50. Such a feature may be desirable in situations where the lower opening 36 of the housing 23 of the first connector 20 is not easily viewed, such as due to obstructions, tight spaces, or the like. The operator can simply touch the lower opening 36. If the operator can feel the lower end 51 of the latch 50 substantially filling the lower opening 36, flush with the lower opening 36, or extending past the lower opening 36, the operator can ascertain that the latch 50 is not in its original, raised position. If the operator cannot feel the lower end 51 of the latch 50 within the lower opening 36, the operator can ascertain that the latch 50 has returned to its original, raised position.

The first connector 20 may provide audible feedback in the form of the snapping sound which occurs when the latch 50 snaps onto the male coupler 70. The first connector 20 may also provide visible feedback by use of the lower opening 36 in the housing 23 which functions as a window to view the position of the latch 50, with the lower end 52 of the latch 50 filling the lower opening 36 when depressed. When the lower opening 36 is empty, or the latch 50 does not fill the lower opening 36, the operator can be assured that the latch 50 is in its raised, original position.

FIGS. 15-17 illustrate the locking connector system 10 in use. In FIG. 15, it can be seen that the first connector 20 is aligned for connection to the second connector 60, with the first connector 20 being connected to a cable 38 and the second connector 60 being connected to a component 12 such as an electrical device. The flat upper edge 76 of the male coupler 70 will ensure proper orientation of the first connector 20 before insertion over the second connector 60 and prevent rotation when they are connected together. With the first connector 20 aligned as shown in FIG. 15, the first connector 20 need only be advanced forward to mechanically engage with the second connector 60.

FIG. 16 illustrates the first connector 20 having been connected to the second connector 60. In this view, the male coupler 70 of the second connector 60 has been inserted within the front opening 30 of the female coupler 40 of the first connector 20. In doing so, the latch 50 has been pushed over the engagement portion 78 and ramp 79 of the male coupler 70 to seat within the catch portion 74 of the male coupler 70.

As can be seen, the button 59 (and underlying latch 50) is in the raised, original position. The latch 50 is engaged within the catch portion 74 such that the first connector 20 cannot be pulled away from mechanical engagement with the second connector 60 due to the flange 75 blocking retraction of the latch 50 without the latch 50 being first pushed downwardly to allow the latch 50 to be removed from around the male coupler 70.

FIG. 17 illustrates the first connector 20 being disconnected from the second connector 60. In this figure, the button 59 has been depressed its lowered position. With the button 59 depressed, the latch 50 is similarly adjusted downwardly so that the inner lower edge 55 of the latch 50 may pass over the flange 75. This allows the first connector 20 to be disengaged and retracted from the second connector 60. Upon releasing the button 59, both the button 59 and the latch 50 are returned to their original, raised position by the bias member 58.

Figure 18A:
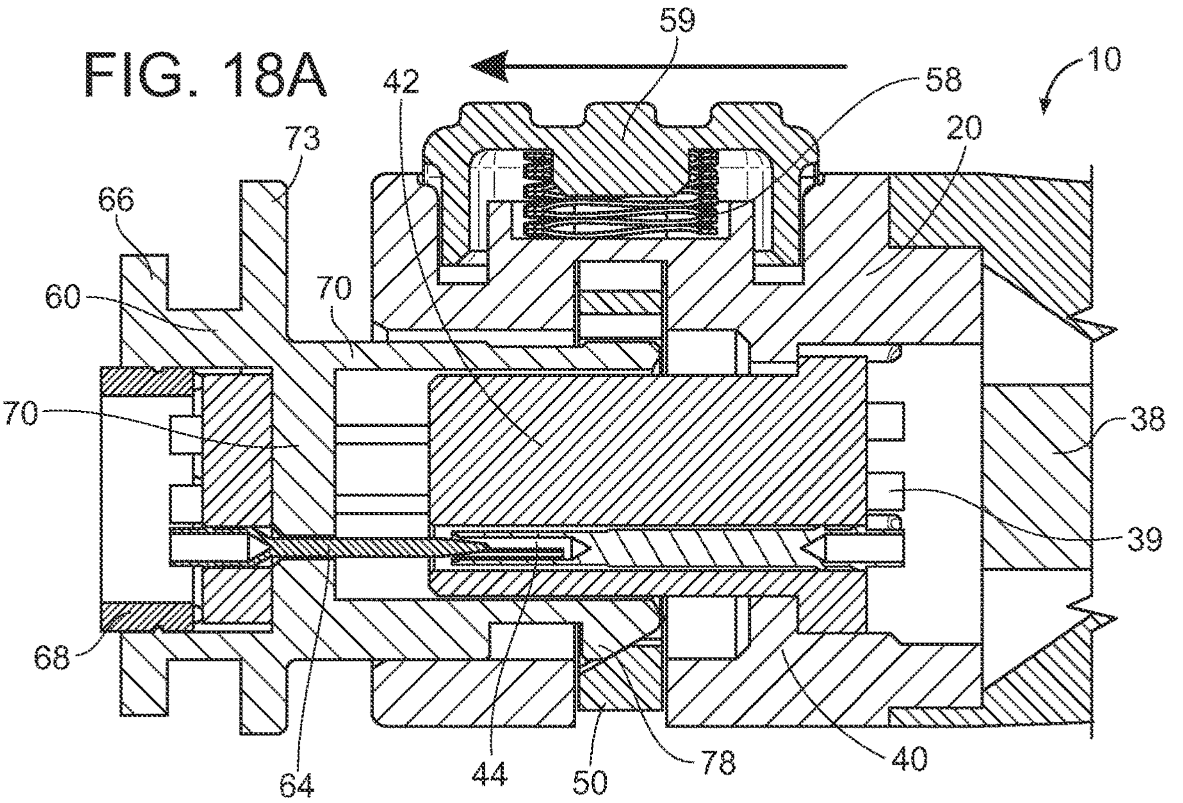
FIG. 18A is a sectional view of a first connector being mechanically connected to a second connector of a locking connector system in accordance with an example embodiment.
Figure 18B:
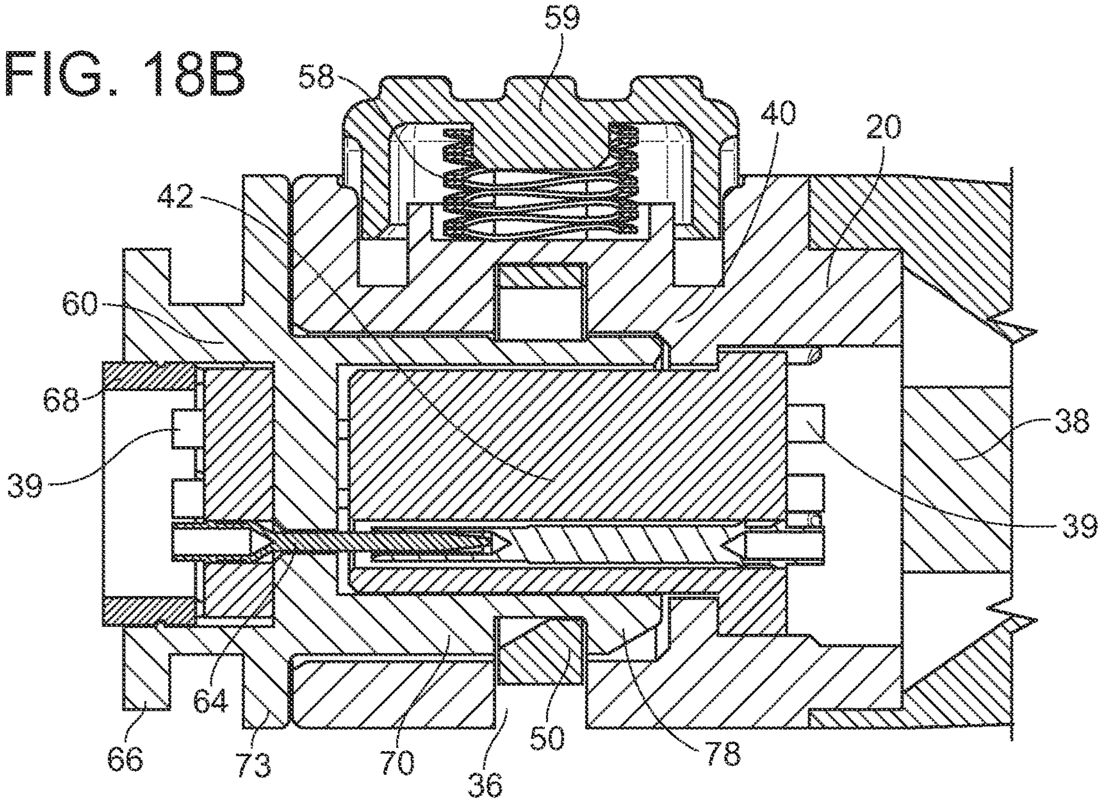
FIG. 18B is a sectional view of a first connector mechanically engaged with a second connector of a locking connector system in accordance with an example embodiment.
Figure 19:
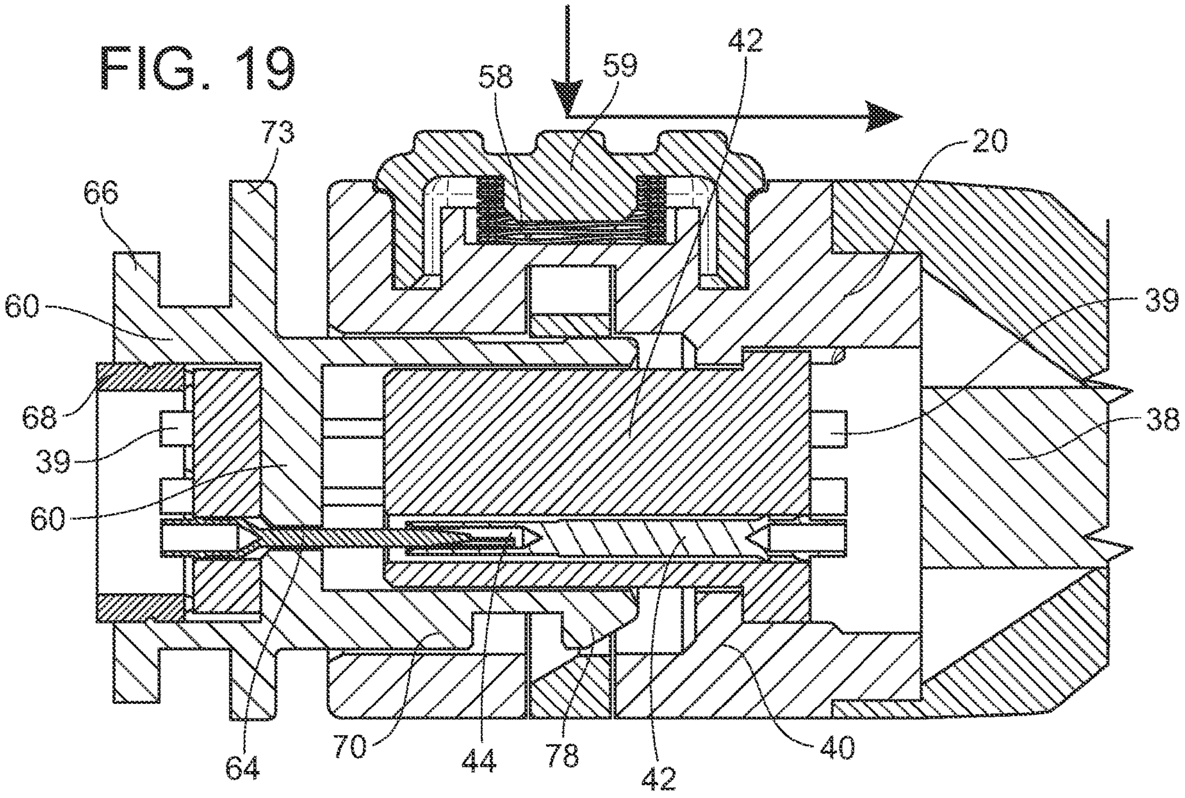
FIG. 19 is a sectional view of a first connector being mechanically disengaged from a second connector of a locking connector system in accordance with an example embodiment.

FIGS. 18A, 18B, and 19 illustrate a sectional view of the interior of both the first and second connectors 20, 60 in use. FIG. 18A illustrates the first connector 20 in the process of being connected to the second connector 60. More specifically, FIG. 18A illustrates the moment when the latch 50 passes over the engagement portion 78 of the male coupler 70 just prior to engaging with the catch portion 74 of the male coupler 70.

The inner lower edge 55 of the latch 50 includes a tapered face to assist with the latch 50 passing under the engagement portion 78 of the male coupler 70. The inner lower edge 55 of the latch 50 passes over the ramp 79 to snap into the catch portion 74 of the male coupler 70 and be retained (locked) in engagement with the catch portion 74 by the flange 75, which prevents the latch 50 from decoupling with the male coupler 70 absent being adjusted vertically to pass over the flange 75.

Continuing to reference FIG. 18A, it can be seen that both the button 59 and latch 50 are in the lowered position. As the latch 50 passes over the engagement portion 78, the button 59 and latch 50 will both be naturally forced downwardly. There will be no need to press the button 59 when connecting the first and second connectors 20, 60 together. The ramp 79 on the engagement portion 78 guides the lower inner edge 55 of the latch 50 over the flange 75 to snap into the catch portion 74. Since there the ramp 79 is oriented only in one direction, the ramp 79 will not allow the latch 50 to be retracted back over the flange 75 without the latch 50 being lowered by the button 59.

FIG. 18B illustrates the first connector 20 locked in mechanical engagement with the second connector 60. In this view, it can be seen that the male coupler 70 of the second connector 60 has been inserted into the female coupler 40 of the first connector 20. The latch 50 is now shown engaged within the catch portion 74 of the male coupler 70, with the flange 75 being positioned to prevent retraction of the latch 50 without first lowering the latch 50 to pass over the flange 75.

Continuing to reference FIG. 18B, it can be seen that the first and second connectors 20, 60 are electrically connected to each other. More specifically, it can be seen that the second electrically conductive elements 64 of the second connector 60 are inserted within the first electrically conductive elements 44 of the first connector 40. In this manner, the first and second connectors 20, 60 are electrically connected to each other.

As can be seen, the button 59 and latch 50 are in their raised, original position and the bias member 58 is extended. The user may quickly ascertain the position of the latch 50 by viewing the lower opening 36 of the housing 23 of the first connector 20, which functions as a window to view the position of the latch 50. As the latch 50 does not fill the lower opening 36, the latch 50 is identifiable as being in the raised position.

When the latch 50 snaps into the catch portion 74 of the male coupler 70, the operator of the locking connector system 10 will provide audible, visual, and tactile feedback to confirm that the first and second connectors 20, 60 are locked in mechanical engagement. The latch 50 will be pushed over the ramp 79 to snap into the catch portion 74, with an audible click being heard at the moment that the latch 50 contacts the catch portion 74. The contact between the latch 50 and the catch portion 74 will also reverberate through the housing 23, providing tactile feedback for the operator who will feel the latch 50 snapping into place. If the operator neither hears nor feels the latch 50 snapping into the catch portion 74, it can be ascertained that the latch 50 did not engage within the catch portion 74 and thus the connectors 20, 60 are not locked in mechanical engagement.

The status of the latch 50 can be viewed through the lower opening 36 of the housing 23 of the first connector 20 to provide visual feedback that the latch 50 is fully engaged within the catch portion 74. If the latch 50 is filling the lower opening 36, it can be ascertained that the latch 50 has not fully engaged within the catch portion 74 and thus the connectors 20, 60 are not fully locked. This may occur, for example, when the connectors 20, 60 are not pushed together sufficiently to extend the latch 50 over the engagement portion 78 and into the catch portion 74.

FIG. 19 illustrates the first connector 20 and second connector 60 being mechanically disengaged and unlocked by pressing the button 59 and retracting the first connector 20 from the second connector 60 by pulling on the first connector 20. As can be seen, the button 59 has been pushed down. When the button 59 is pushed down, the latch 50 is similarly forced downwardly, which allows the latch 50 to pass over the flange 75 and be disengaged from the catch portion 74. An operator may confirm the positioning of the latch 50 by viewing the lower opening 36 of the first connector 20, which in this view is filled by the lower end 52 of the latch 50 indicating that the latch 50 is in its lowered position.

After the latch 50 has passed over the flange 75, the button 59 may be released. The bias member 58 will push the button 59 upwardly to its original position. The latch 50, which is connected to the button 59, will similarly be raised to its original position. The first and second connectors 20, 60 may then be completely disconnected.

F. Manual Latch Embodiment

FIGS. 23-31 illustrate another exemplary embodiment of the locking connector system 10 in which the latch 50 is manually adjusted between a latched position and an unlatched position. Such an embodiment of the locking connector system 10 may omit the use of a bias member 58, with the latch 50 remaining in either the latched position or the unlatched position absent application of force by the user.

Figure 25:
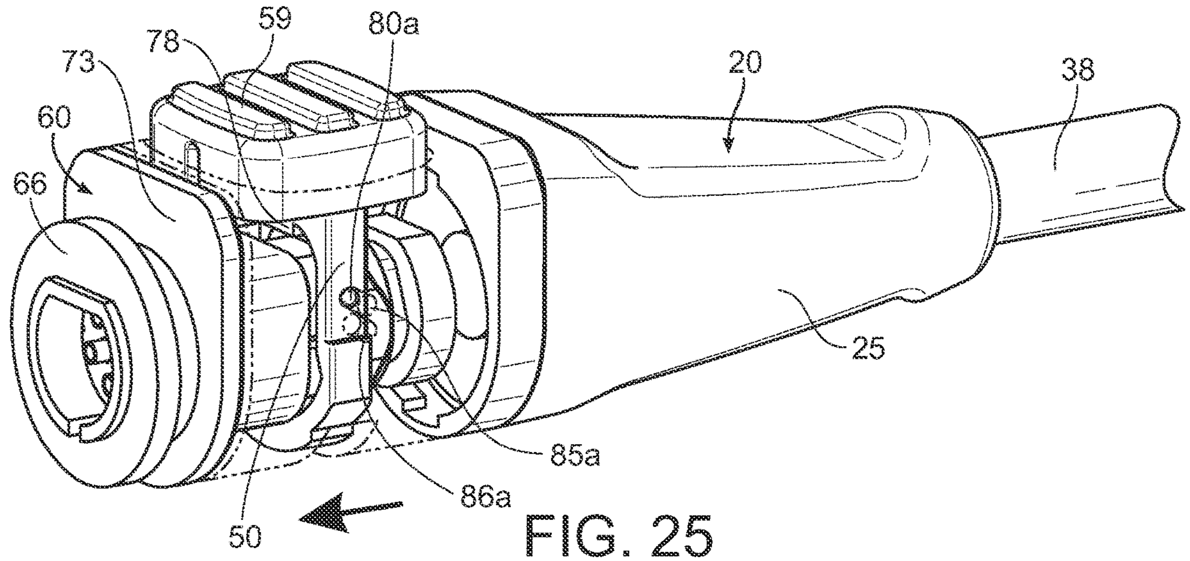
FIG. 25 is a perspective view of a first connector engaging with a second connector of a locking connector system in accordance with an example embodiment.
Figure 26:
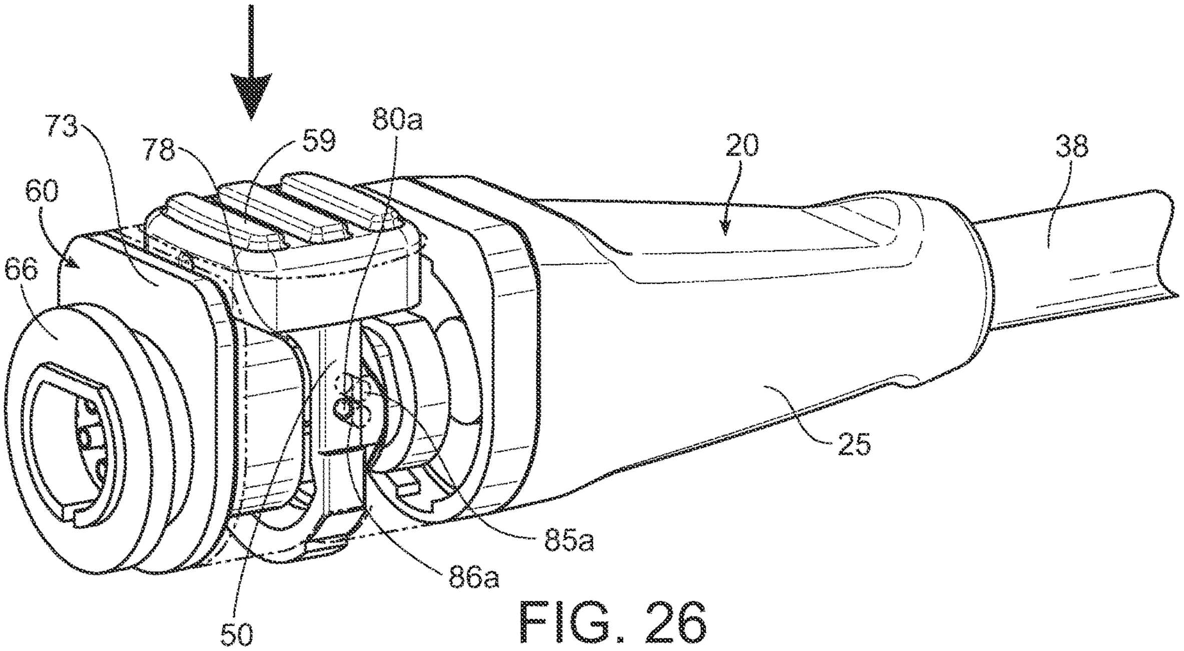
FIG. 26 is a perspective view of a first connector engaged and being locked with a second connector of a locking connector system in accordance with an example embodiment.
Figure 27:
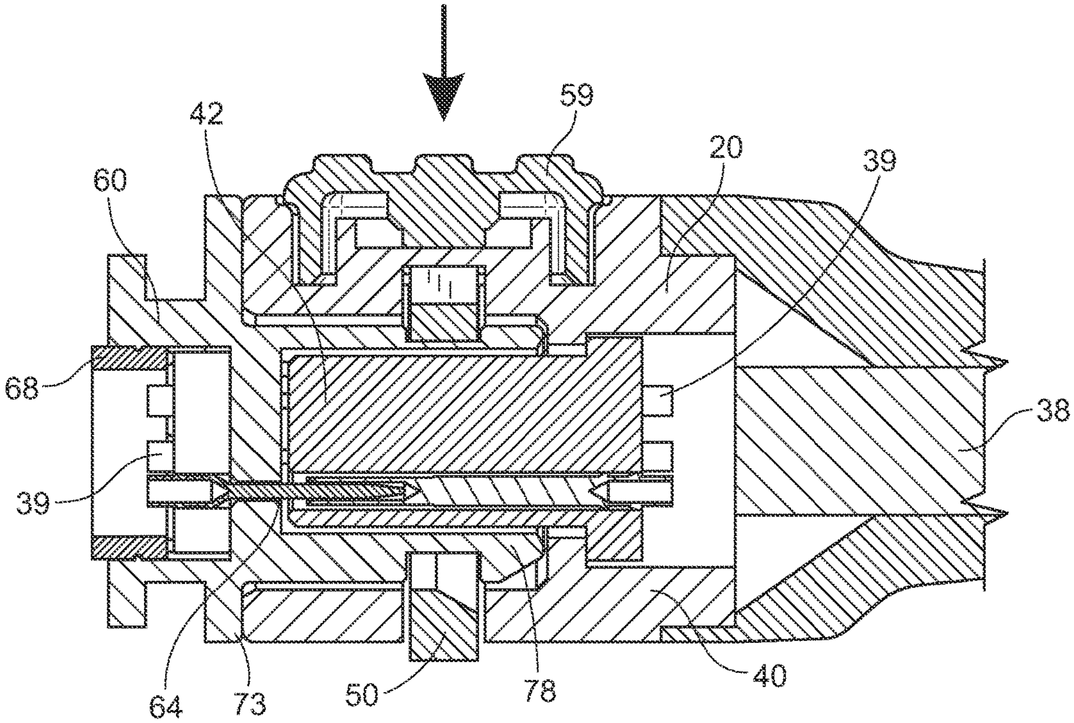
FIG. 27 is a side sectional view of a first connector being locked with second connector of a locking connector system in accordance with an example embodiment.

In the exemplary embodiment shown in FIGS. 22-31, the latch 50 may be engaged so as to lock the connectors 20, 60 when the latch 50 is in the lowered position such as shown in FIGS. 23, 25, and 28-30 and the latch 50 may be disengaged so as to unlock the connectors 20, 60 when the latch 50 is in the raised position such as shown in FIG. 27. It should be appreciated, however, that in some embodiments the opposite configuration may be utilized, with the latch 50 being disengaged in the raised position and engaged in the lowered position.

Figure 31:
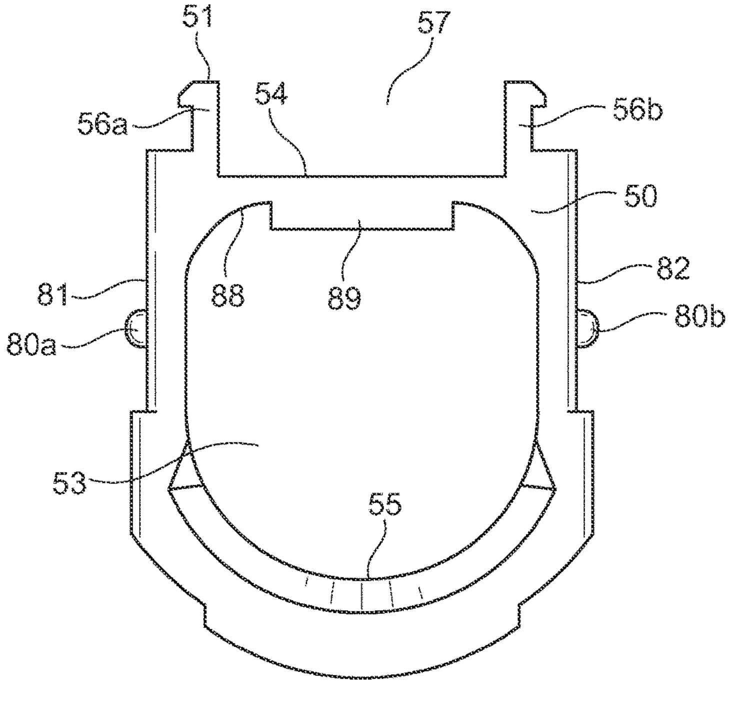
FIG. 31 is a frontal view of a latch of a locking connector system in accordance with an example embodiment.

FIG. 31 illustrates an exemplary embodiment of a latch 50 for use with a manually-adjusted embodiment of a locking connector system 10. The latch 50 comprises a central opening 53 including an inner upper edge 88 and an inner lower edge 55. The central opening 53 is shaped such that the male coupler 70 may extend through the latch 50. The inner lower edge 55 is illustrated as comprising an upwardly-curved edge with a substantial U-shape.

Continuing to reference FIG. 31, the outer upper edge 54 of the latch 50 is shown as comprising a pair of flanges **56*a*, 56*b* for use in connecting the button 59 to the upper end 51 of the latch 50. It should be appreciated that the button 59 may be connected to the latch 50 in various other methods, such as by use of a fastener 47** or integral formation as discussed previously.

An engagement portion 78 extends downwardly from the inner upper edge 88 of the latch 50 so as to selectively engage with the catch portion 74 of the male coupler 70 of the second connector 60. The catch portion 74 of the male coupler 70 may be positioned at the top of the male coupler 70 in such an embodiment, such that the engagement member 89 may be lowered into locking engagement with the male coupler 70 or raised to be released from locking engagement with the male coupler 70.

The engagement member 89 may comprise various projections or extensions which extend downwardly from the inner upper edge 88 of the latch 50. By way of example, the engagement member 89 may comprise a rib, elongated projection, rectangular projection, fastener, tab, or the like. In some embodiments, the engagement member 89 may instead be on the inner lower edge 55 of the latch 50 so as to selectively engage with a catch portion 74 on the bottom of the male coupler 70.

Continuing to reference FIG. 31, the latch 50 includes a first side 81 and a second side 82. The first side 81 of the latch 50 includes a first projection **80*a* and the second side 82 of the latch 50 includes a second projection 80*b*. Each of the projections 80*a*, 80*b* may comprise various types of projections such as fasteners, nubs, bumps, round projections, elongated projections, and the like. The projections 80*a*, 80*b* may be utilized to secure the latch 50 in either the raised or the lowered position, as well as to provide a visual indication of the status of the latch 50**.

The housing 23 of the first connector 20 may include first upper and lower side openings **85*a*, 86*a* on its first side and second upper and lower side openings 85*b*, 86*b* on its second side such as shown in FIGS. 23-26, 28, and 30. In the exemplary embodiment shown in the figures, the upper and lower side openings 85*a*, 85*b*, 86*a*, 86*b* are positioned on the respective sides of the female coupler 40 of the front portion 24 of the housing 23. The first upper side opening 85*a* may be positioned directly above the first lower side opening 86*a* and the second upper side opening 85*b* may be positioned directly above the second lower side opening 86*b*. The spacing between respective upper side openings 85*a*, 85*b* and lower side openings 86*a*, 86*b* on the housing 23** may vary in different embodiments.

The first projection 80*a* on the first side 81 of the latch 50 may be adapted to selectively engage within one of a pair of side openings 85*a*, 86*a* on a first side of the housing 23 of the first connector 20 and the second projection 80*b* on the second side 82 of the latch 50 may be adapted to selectively engage within one of a pair of side openings 85*b*, 86*b* on a second side of the housing 23.

When the latch 50 is in the raised position, the first projection 80*a* on the first side 81 of the latch 50 will engage within the first upper side opening 85*a* on the first side of the housing 23 and the second projection 80*b* on the second side 82 of the latch 50 will engage within the second upper side opening 86*a* on the second side of the housing 23. When the latch 50 is in the lowered position, the first projection 80*a* on the first side 81 of the latch 50 will engage within the first lower side opening 86*a* on the first side of the housing 23 and the second projection 80*b* on the second side 82 of the latch 50 will engage within the second lower side opening 86*b* on the second side of the housing 23.

Figure 23:
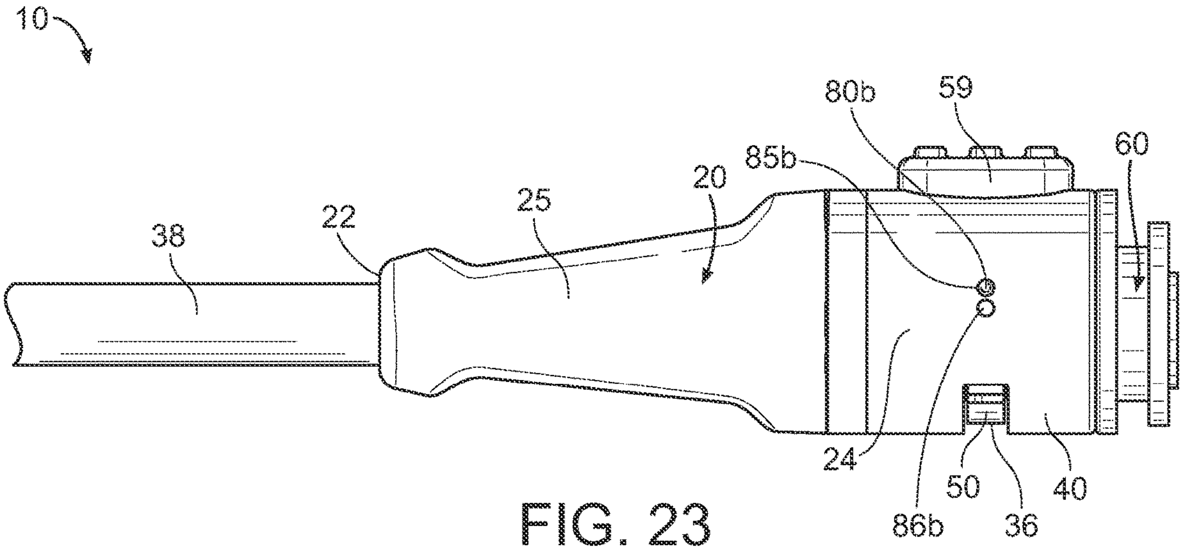
FIG. 23 is a side view of a first and second connector engaged and locked of a locking connector system in accordance with an example embodiment.
Figure 24:
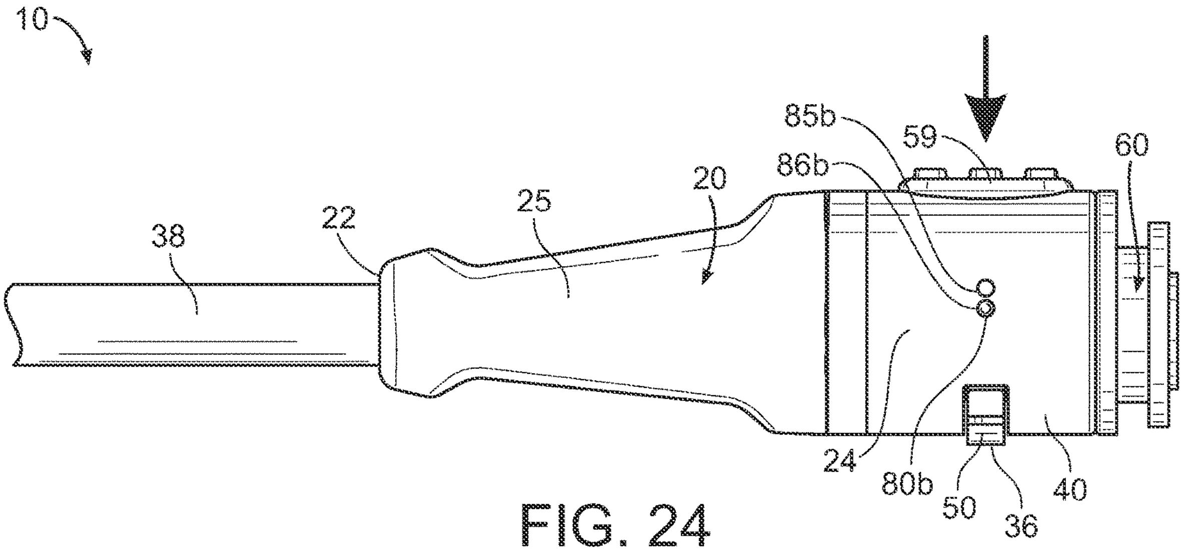
FIG. 24 is a side view of a first and second connector engaged but not locked of a locking connector system in accordance with an example embodiment.

FIG. 23 illustrates a first and second connector 20, 60 being engaged but not locked, with the button 59 being in the raised position and the projections 80*a*, 80*b* being positioned in the upper side openings 85*a*, 86*a*. FIG. 24 illustrates the button 59 being pressed downwardly, which lowers the latch 50 such that the engagement member 89 on the inner upper edge 88 of the latch 50 engages within a corresponding catch portion 74 of the male coupler 70. The projections 80*a*, 80*b* are also shown as being connected within the lower side openings 86*a*, 86*b*. The projections 80*a*, 80*b* retain the latch 50 in its raised or lowered position absent application of force by the user.

FIGS. 25, 26, 28, and 30 illustrate various states of engagement and locking between the first and second connectors 20, 60, with the female coupler 40 being transparent to illustrate positioning of the latch 50. FIG. 25 illustrates the first and second connectors 20, 60 being engaged with each other, with the male coupler 70 being inserted within the female coupler 40.

FIG. 26 illustrates the button 59 being pressed downwardly, which lowers the latch 50 such that the engagement member 89 engages within the catch portion 74 of the male coupler 70 to lock the connectors 20, 60 together such as shown in FIG. 27. The projections 80*a*, 80*b* are engaged within the upper side openings 85*a*, 85*b* to retain the button 59 and latch 50 in the lowered position absent application of upward force. The lower end 52 of the latch 50 is visible within the lower opening 36 of the housing 23.

Figure 28:
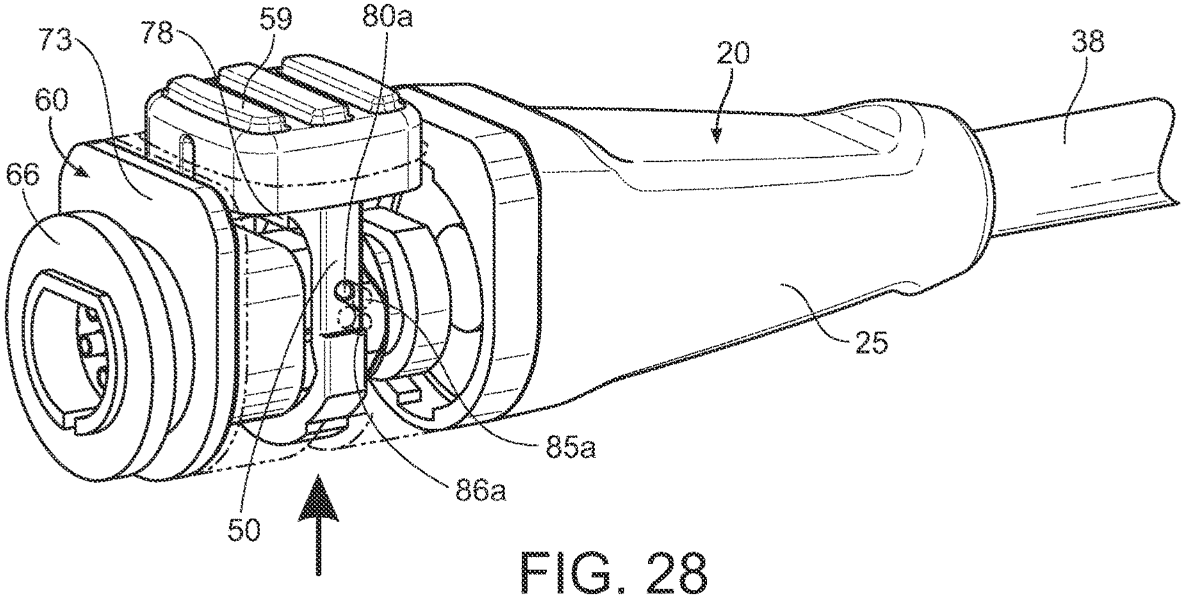
FIG. 28 is a perspective view of a first connector being unlocked from a second connector of a locking connector system in accordance with an example embodiment.
Figure 29:
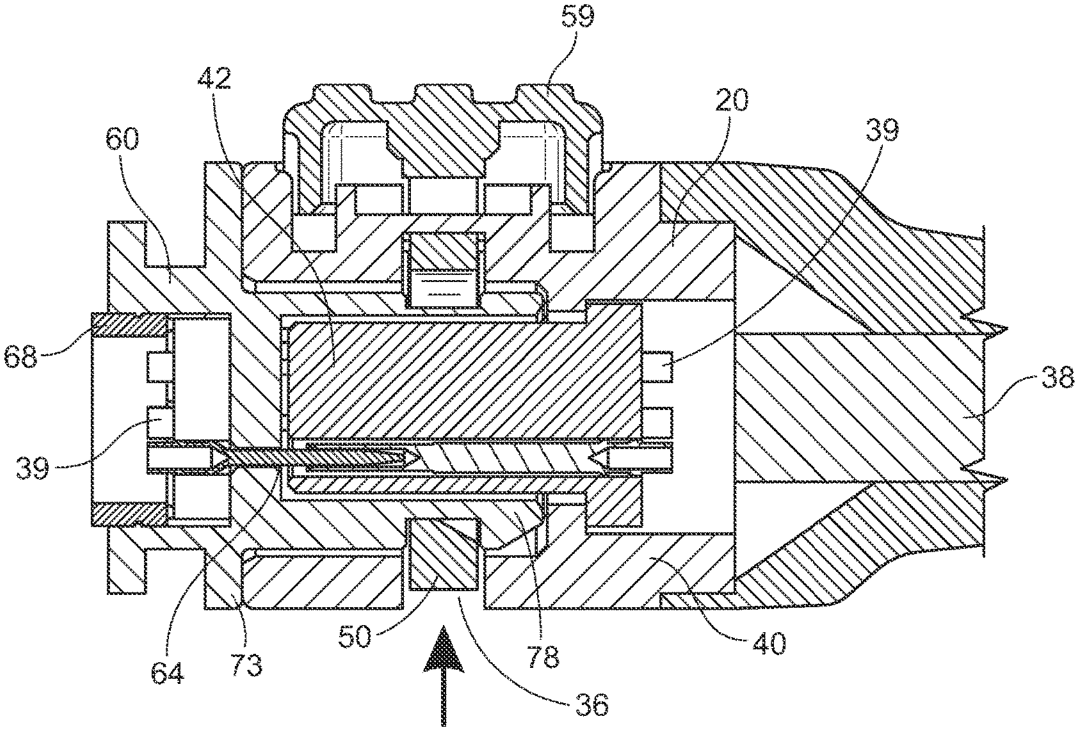
FIG. 29 is a side sectional view of a first connector being unlocked from a second connector of a locking connector system in accordance with an example embodiment.
Figure 30:
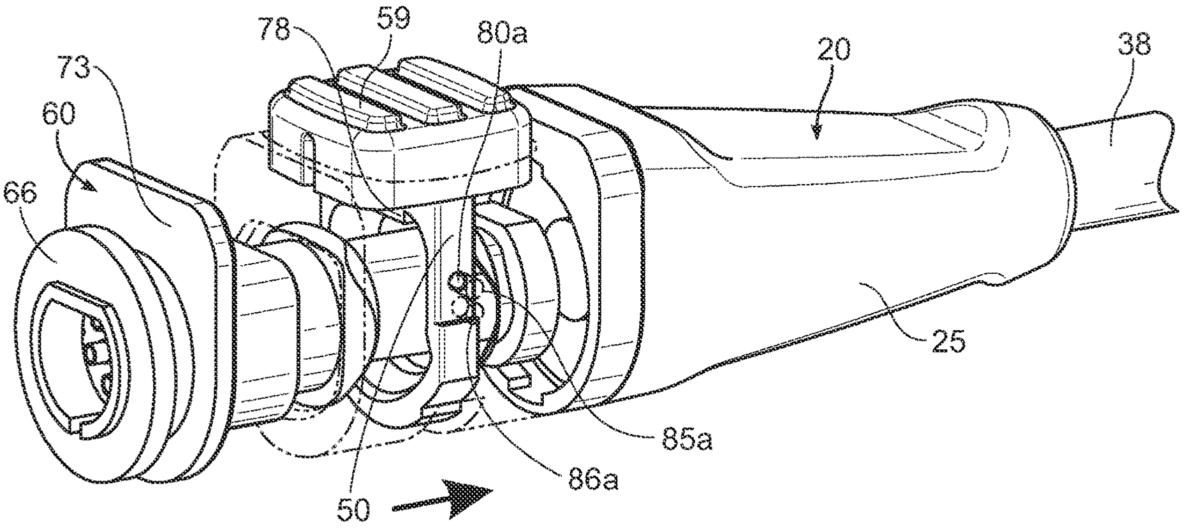
FIG. 30 is a perspective view of a first connector and a second connector being disengaged of a locking connector system in accordance with an example embodiment.

FIG. 28 illustrates the button 59 being lifted upwardly, which raises the latch 50 such that the engagement member 89 disengages from within the catch portion 74 of the male coupler 70 to unlock the connectors 20, 60 such as shown in FIG. 29. The projections 80*a*, 80*b* are engaged within the lower side openings 86*a*, 86*b* to retain the button 59 and latch 50 in the raised position absent application of downward force. The lower end 52 of the latch 50 either is not visible or is only partially visible within the lower opening 36 of the housing 23. FIG. 30 illustrates the first and second connectors 20, 60 being disengaged from each other with the button 59 and latch 50 being in the raised position and not engaged with the catch portion 74 of the male coupler 70 so that the male coupler 70 may be withdrawn from the female coupler 40.

Unless otherwise defined, all technical and scientific terms used herein have the same meaning as commonly understood by one of ordinary skill in the art to which this invention belongs. Although methods and materials similar to or equivalent to those described herein can be used in the practice or testing of the locking connector system, suitable methods and materials are described above. All publications, patent applications, patents, and other references mentioned herein are incorporated by reference in their entirety to the extent allowed by applicable law and regulations. The locking connector system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A locking connector system, comprising:

a first connector comprising a front end, a rear end, and a housing, wherein the first connector is comprised of a plurality of first electrically conductive elements;

a second connector comprising a front end and a rear end, wherein the second connector is comprised of a plurality of second electrically conductive elements, wherein the first connector is adapted to be removably connected to the second connector; and a latch movably connected to the first connector and encircling the plurality of first electrically conductive elements, wherein the latch is adjustable between a first position and a second position;

a depressible button that is integrally formed with the latch to move the latch between the first position and the second position;

wherein the latch is adapted to engage with the second connector when the latch is in the first position so as to lock the first connector in mechanical engagement with the second connector, wherein the latch is adapted to disengage from the second connector when the latch is in the second position so as to release the first connector and the second connector; and wherein the housing of the first connector includes a lower opening for providing both a visual and a tactile indicator of whether the latch is in the first position or the second position.

2. The locking connector system of claim 1, wherein the first position of the latch is comprised of a raised position and wherein the second position of the latch is comprised of a lowered position.

3. The locking connector system of claim 1, wherein the plurality of first electrically conductive elements and the plurality of second electrically conductive elements are comprised of pins or sockets.

4. The locking connector system of claim 1, wherein the first connector comprises a female coupler and wherein the second connector comprises a male coupler.

5. The locking connector system of claim 1, further comprising a bias member connected to the latch.

6. The locking connector system of claim 5, wherein the latch is biased towards the first position by the bias member.

7. The locking connector system of claim 6, wherein the second connector comprises a catch portion, and wherein the latch is adapted to engage with the catch portion of the second connector when the latch is in the first position.

8. The locking connector system of claim 7, wherein the catch portion of the second connector is comprised of a flange.

9. The locking connector system of claim 1, wherein the latch is adapted to audibly click when the latch engages with the second connector.

10. The locking connector system of claim 1, wherein the housing is adapted to reverberate when the latch engages with the second connector.

11. A locking connector system, comprising:

a first connector comprising a front end, a rear end, and a housing, wherein the first connector is comprised of a plurality of first electrically conductive elements;

a second connector comprising a front end and a rear end, wherein the second connector is comprised of a plurality of second electrically conductive elements, wherein the first connector is adapted to be removably connected to the second connector;

a latch movably connected to the first connector and encircling the plurality of first electrically conductive elements, wherein the latch is adjustable between a first position and a second position; and a bias member connected to the latch that biases the latch toward the first position;

wherein the latch is adapted to engage with the second connector when the latch is in the first position so as to lock the first connector in mechanical engagement with the second connector, wherein the latch is adapted to disengage from the second connector when the latch is in the second position so as to release the first connector and the second connector; and wherein the housing of the first connector includes a lower opening for providing both a visual and a tactile indicator of whether the latch is in the first position or the second position.

12. The locking connector system of claim 11, wherein the bias member comprises a spring.

13. The locking connector system of claim 11, further comprising a button connected to an upper end of the latch.

14. The locking connector system of claim 13, wherein the button extends at least partially out of an upper end of the housing.

15. The locking connector system of claim 13, wherein the bias member is adapted to bias the button towards the first position.

16. The locking connector system of claim 14, wherein the bias member is connected between the upper end of the latch and the button.

17. The locking connector system of claim 13, wherein the button is adapted to be pressed downwardly to push the latch into the second position.

18. A locking connector system, comprising:

a first connector comprising a front end, a rear end, and a housing, wherein the first connector is comprised of a plurality of first electrically conductive elements;

a second connector comprising a front end and a rear end, wherein the second connector is comprised of a plurality of second electrically conductive elements, wherein the first connector is adapted to be removably connected to the second connector; and a latch movably connected to the first connector and encircling the plurality of first electrically conductive elements, wherein the latch is adjustable between a first position and a second position;

wherein the latch is adapted to engage with a catch portion positioned intermediate the front end and the rear end of the second connector when the latch is in the first position so as to lock the first connector in mechanical engagement with the second connector, wherein the latch is adapted to disengage from the second connector when the latch is in the second position so as to release the first connector and the second connector; and wherein the housing of the first connector includes a lower opening for providing both a visual and a tactile indicator of whether the latch is in the first position or the second position.

* * * * *